United States Patent
Chen

(10) Patent No.: US 10,320,649 B2
(45) Date of Patent: Jun. 11, 2019

(54) METHOD AND SYSTEM FOR IMPLEMENTING VIRTUAL NETWORK FUNCTION PERFORMANCE MONITORING

(71) Applicant: ZTE Corporation, Shenzhen (CN)

(72) Inventor: Liping Chen, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 22 days.

(21) Appl. No.: 15/545,516

(22) PCT Filed: Aug. 26, 2015

(86) PCT No.: PCT/CN2015/088153
§ 371 (c)(1),
(2) Date: Jul. 21, 2017

(87) PCT Pub. No.: WO2016/115900
PCT Pub. Date: Jul. 28, 2016

(65) Prior Publication Data
US 2018/0013656 A1 Jan. 11, 2018

(30) Foreign Application Priority Data
Jan. 21, 2015 (CN) .......................... 2015 1 0031722

(51) Int. Cl.
*G06F 15/16* (2006.01)
*H04L 12/26* (2006.01)
(Continued)

(52) U.S. Cl.
CPC .......... *H04L 43/16* (2013.01); *H04L 41/0686* (2013.01); *H04W 24/02* (2013.01); *H04W 24/04* (2013.01)

(58) Field of Classification Search
CPC .... H04L 43/16; H04L 41/0686; H04W 24/02; H04W 24/04
(Continued)

(56) References Cited

U.S. PATENT DOCUMENTS 9,584,377 B2* 2/2017 Prasad
9,806,975 B2* 10/2017 Xiang ..................... H04L 67/10
(Continued)

FOREIGN PATENT DOCUMENTS

| CN | 104050045 A | 9/2014 |
| CN | 104253866 A | 12/2014 |

(Continued)

OTHER PUBLICATIONS

International Search Report dated Nov. 26, 2015 re: Application No. PCT/CN2015/088153; pp. 1-2; citing: CN 1104050045 A, CN 104253866 A, CN 104601492 A, WO 2015118875 A1 and Jeremy "Introduction of Network" . . . .

(Continued)

*Primary Examiner* — Melvin H Pollack
(74) *Attorney, Agent, or Firm* — Cantor Colburn LLP

(57) ABSTRACT

A method and corresponding system for implementing Virtual Network Function (VNF) performance monitoring is provided. The method includes that: an Element Management (EM) receives a threshold policy of a VNF performance monitoring threshold sent by a Network Management (NM) or an Operation Support System (OSS); the EM acquires related information about virtual resources after the VNF is scaled up/down; and the EM sets a new performance monitoring threshold for the VNF according to the threshold policy and the related information about virtual resources after the VNF is scaled up/down, and the performance monitoring threshold includes at least one of a scale up/down threshold and a performance warning threshold.

20 Claims, 13 Drawing Sheets

(51) Int. Cl.
*H04W 24/04* (2009.01)
*H04L 12/24* (2006.01)
*H04W 24/02* (2009.01)

(58) Field of Classification Search
USPC .......................................................... 709/224
See application file for complete search history.

(56) References Cited

U.S. PATENT DOCUMENTS

| | | | | |
|---|---|---|---|---|
| 9,838,253 | B2* | 12/2017 | Wang | H04L 41/0806 |
| 9,870,580 | B2* | 1/2018 | Rao | G06Q 30/04 |
| 9,912,558 | B2* | 3/2018 | Chou | H04L 43/08 |
| 9,913,151 | B2* | 3/2018 | Li | H04W 24/02 |
| 9,936,047 | B2* | 4/2018 | Adolph | H04L 12/4641 |
| 9,979,602 | B1* | 5/2018 | Chinnakannan | H04L 41/12 |
| 10,055,240 | B2* | 8/2018 | Chastain | G06F 9/45533 |
| 10,057,127 | B2* | 8/2018 | Zhu | H04W 28/08 |
| 10,073,729 | B2* | 9/2018 | Liu | H04L 67/10 |
| 10,097,372 | B2* | 10/2018 | Bhattacharya | H04L 45/745 |
| 10,164,944 | B1* | 12/2018 | Felstaine | H04L 63/04 |
| 2017/0244647 | A1* | 8/2017 | Jin | H04L 29/08 |
| 2017/0257276 | A1* | 9/2017 | Chou | H04L 41/0823 |
| 2017/0346676 | A1* | 11/2017 | Andrianov | H04L 41/0631 |

FOREIGN PATENT DOCUMENTS

| | | |
|---|---|---|
| CN | 104601492 A | 5/2015 |
| WO | 2015118875 A1 | 8/2015 |

OTHER PUBLICATIONS

Written Opinion dated Nov. 26, 2015 re: Application No. PCT/CN2015/088153; pp. 1-8; citing: CN 104050045 A and CN 104253866 A.

\* cited by examiner

METHOD AND SYSTEM FOR IMPLEMENTING VIRTUAL NETWORK FUNCTION PERFORMANCE MONITORING

TECHNICAL FIELD

The present disclosure relates to the field of mobile communication network management, and in particular to a method and system for implementing Virtual Network Function (VNF) performance monitoring.

BACKGROUND

In a mobile communication network, an operator estimates network quality, network or service resource utilization, and processing capacity of a network by means of analysis of performance measuring data. The operator also timely controls operations of the network by performing threshold monitoring to performance data. When a performance measured value exceeds a preset threshold for the measurement, a corresponding notification including performance warnings will be reported to the operator, so that the operator takes corresponding measures timely to prevent the network from failing or even breaking down.

After network function virtualization, there are some changes in a network management architecture and mechanism. Management architecture after the network function virtualization is shown in FIG. 1, including a variety of network elements. A Network Function Virtualization Orchestrator (NFVO) takes charge of lifecycle management of network services, Network Function Visualization Infrastructure (NFVI) resources scheduling cross a Virtualized Infrastructure Manager (VIM) and other functions. A VNF manager takes charge of lifecycle management of the VNF, and each VNF is associated with a VNF Manager (VNFM). The VIM takes charge of controlling and managing NFVI computation, storage and network resources. The VNF in FIG. 1 is one of a Packet Data Network (PDN) GateWay (PGW), a Gateway GPRS Support Node (GGSN) and other network element.

There are scale operations including a scale out/up operation and a scale in/down operation in the lifecycle of the VNF, which adjust virtual resources of the VNF.

A traditional network management generally adopts a three-layer management structure including a Network Management (NM) or an Operation Support System (OSS), an Element Management (EM) and network elements. The NM is also called a Network Management System (NMS), and the EM is also called an Element Management System (EMS). An interface between the OSS/NM and the EM is a northbound interface, and an interface between the EM and the network element is a southbound interface. The EM completes configuration of the network element and acquisition of network element performance, faults, warning and other information. The NM faces network monitoring and analysis of the entire network, and functions in monitoring and operation of a network topology, failure warning and accepting of the entire network, acquisition and configuration distribution of configuration information of the entire network, performance monitoring and analysis of an end-to-end network, and monitoring and analysis of traffic direction and traffic direction.

A processing capacity of a network element in the traditional network is fixed, and for an indicate which is used for measuring the performance of the network element, a threshold indicating that the performance processing capacity of the network element is almost saturated is relatively fixed. However after the network function virtualization, the processing capacity of the VNF will change according to the condition of allocated virtual resource, so it is required that a related performance warning threshold is reset after the virtual resource of the VNF changes, but a related technical solution has not been presented.

Note that, presentation ways of letter V in the VNF are different in different specifications, some of which are virtual, and some are virtualised or virtualized, which is not limited here.

SUMMARY

The following is a summary of a topic elaborated in the specification. The summary is not intended to limit a protection scope of claims.

In view of this, an embodiment of the present disclosure provides a method for implementing VNF performance monitoring, which includes that: receiving, by an Element Management (EM), a threshold policy of a VNF performance monitoring threshold sent by a Network Management (NM) or an Operation Support System (OSS); acquiring, by the EM, related information about virtual resources after the VNF is scaled up/down; and setting, by the EM, a new performance monitoring threshold for the VNF according to the threshold policy and the related information about virtual resources after the VNF is scaled up/down, and the performance monitoring threshold includes at least one of a scale up/down threshold and a performance warning threshold.

In one embodiment, before setting, by the EM, the new performance monitoring threshold for the VNF, further including: receiving, by the EM, an initial VNF performance monitoring threshold sent by the NM or the OSS; after setting, by the EM, the new performance monitoring threshold for the VNF, the method further includes: notifying, by the EM, a new VNF performance monitoring threshold to the NM or the OSS.

In one embodiment, acquiring, by the EM, the related information about virtual resources after the VNF is scaled up/down includes: receiving, by the EM, the related information about virtual resources after the VNF is scaled up/down which is sent by a VNF Manager (VNFM); or, receiving, by the EM, the related information about virtual resources after the VNF is scaled up/down which is sent by the VNF.

In one embodiment, before receiving, by the EM, the related information about virtual resources after the VNF is scaled up/down which is sent by the VNF, further including: receiving, by the EM, an information change notification which is sent by the VNF after the VNF is scaled up/down; and requesting, by the EM, the VNF for the related information about virtual resources after the VNF is scaled up/down.

In one embodiment, the performance monitoring threshold includes the scale up/down threshold, and before acquiring, by the EM, the related information about virtual resources after the VNF is scaled up/down, further including: receiving, by the EM, a monitored performance measurement of the VNF sent by the NM or the OSS, and indicating, by the EM, the VNF to measure the monitored performance measurement and obtain a measured value; comparing, by the EM, the measured value with a current scale up/down threshold of the VNF, and when determining to scale up or scale down the VNF, sending, by the EM, a request message to the VNFM, so as to request the VNFM to perform a scale up operation or a scale down operation to the virtual resources of the VNF.

In one embodiment, the threshold policy received by the EM includes a threshold policy of a performance warning threshold; and the new performance monitoring threshold that the EM sets for the VFN includes a performance warning threshold; before receiving, by the EM, the related information about virtual resources after the VNF is scaled up/down which is sent by the VNFM, the method further includes: obtaining, by the VNFM, a measured value of the monitored performance measurement of the VNF; comparing, by the VNFM, the measured value with a current scale up/down threshold of the VNF, and when determining to scale up or scale down the VNF, performing, by the VNFM, the scale up operation or the scale down operation to the virtual resources of the VNF.

In one embodiment, obtaining, by the VNFM, the measured value of the monitored performance measurement of the VNF includes: receiving, by the VNFM, the monitored performance measurement of the VNF which is sent by the NM or the OSS through a Network Function Virtualization Orchestrator (NFVO), and indicating, by the VNFM, a Virtualized Infrastructure Manager (VIM) to measure the monitored performance measurement of the VNF and obtain the measured value; or, receiving, by the VNFM, a measured value of the monitored performance measurement of the VNF sent by the EM.

In one embodiment, before performing, by the VNFM, the scale up operation or the scale down operation to the virtual resources of the VNF, further including: receiving, by the VNFM, a threshold policy of a scale up/down threshold of the VNF which is sent by the NM or the OSS through the NFVO; after performing, by the VNFM, the scale up operation or the scale down operation to the virtual resources of the VNF, the method further includes: performing, by the VNFM, the scale up operation or the scale down operation successfully, and setting, by the VNFM, a new scale up/down threshold for the VNF according to the related information about virtual resources after the VNF is scaled up/down and the threshold policy of the scale up/down threshold.

In one embodiment, before determining, by the VNFM, to scale up or scale down the VNF, further including: receiving, by the VNFM, an initial scale up/down threshold of the VNF which is sent by the NM or the OSS through the NFVO; after setting, by the VNFM, the new scale up/down threshold for the VNF, the method further includes: notifying, by the VNFM, the new scale up/down threshold of the VNF to the NM or the OSS through the NFVO.

In one embodiment, the related information about virtual resources includes at least one of information about virtual resource capacity and information about the maximum processing capacity corresponding to a monitored performance measurement.

In one embodiment, the threshold policy is set with a ratio value required between a performance monitoring threshold and a value of a virtual resource capacity or the maximum processing capacity corresponding to the monitored performance measurement.

In one embodiment, the scale up/down threshold includes at least one of a scale up threshold and a scale down threshold; comparing, by the EM, the measured value with the current scale up/down threshold of the VNF to determine whether to scale up or scale down the VNF includes: for the monitored performance measurement which requires more resources when a value of the monitored performance measurement is greater, when the measured value is greater than the scale up threshold, determining, by the EM, to scale up the VNF; and/or, when the measured value is less than the scale down threshold, determining, by the EM, to scale down the VNF; for the monitored performance measurement which requires more resources when the value of the monitored performance measurement is smaller, when the measured value is less than the scale up threshold, determining, by the EM, to scale up the VNF; and/or, when the measured value is greater than the scale down threshold, determining, by the EM, to scale down the VNF.

In one embodiment, the threshold policy received by the EM includes a threshold policy of a performance warning threshold; and a new performance monitoring threshold that the EM sets for the VFN includes a performance warning threshold; after performing, by the VNFM, the scale up operation to the virtual resources of the VNF, the method further includes: failing, by the VNFM, to perform the scale up operation; receiving, by the EM, a notification about failing to scale up the VNF which is sent by the VNFM or the VNF, comparing, by the EM, the measured value with the current performance warning threshold of the VNF, and when determining, by the EM, to warn, sending, by the EM, a VNF performance warning notification to the NM or the OSS.

In one embodiment, after performing, by the VNFM, the scale up operation or the scale down operation to the virtual resources of the VNF, the method further includes: when the VNFM fails to perform the scale up operation or the scale down operation, sending, by the VNFM, a notification about failing to scale up or scale down the VNF to the NM or the OSS through the NFVO; or when the VNFM fails to perform the scale up operation or the scale down operation, sending, by the VNFM, a notification about failing to scale up or scale down the VNF to the EM; after receiving the notification, sending, by the EM, the notification about failing to scale up or scale down the VNF to the NM or the OSS.

In view of this, another embodiment of the present disclosure also provides a method for implement VNF performance monitoring, which includes that:

receiving, by a VNF Manager (VNFM), a threshold policy of a VNF performance monitoring threshold which is sent by a Network Management (NM) or an Operation Support System (OSS) through a Network Function Virtualization Orchestrator (NFVO); acquiring, by the VNFM, related information about virtual resources after the VNF is scaled up/down; and setting, by the VNFM, a new performance monitoring threshold for the VNF according to the threshold policy and the related information about virtual resources after the VNF is scaled up/down, and the performance monitoring threshold includes at least one of a scale up/down threshold and a performance warning threshold.

In one embodiment, before setting, by the VNFM, the new performance monitoring threshold for the VNF, further including: receiving, by the VNFM, an initial VNF performance monitoring threshold sent by the NM or the OSS through the NFVO; after setting, by the VNFM, the new performance monitoring threshold for the VNF, the method further includes: notifying, by the VNFM, the new VNF performance monitoring threshold to the NM or the OSS through the NFVO.

In one embodiment, before acquiring, by the VNFM, the related information about virtual resources after the VNF is scaled up/down, further including: obtaining, by the VNFM, a measured value of a monitored performance measurement of the VNF; comparing, by the VNFM, the measured value with a current scale up/down threshold of the VNF, and when determining to scale up or scale down the VNF, performing, by the VNFM, a scale up operation or a scale down operation to the virtual resources of the VNF, so as to acquire the related information about virtual resources after the VNF is scaled up/down.

In one embodiment, the scale up/down threshold includes at least one of a scale up threshold and a scale down threshold; comparing, by the VNFM, the measured value with the current scale up/down threshold of the VNF to determine whether to scale up or scale down the VNF includes: for the monitored performance measurement which requires more resources when a value of the monitored performance measurement is greater, when the measured value is greater than the scale up threshold, determining, by the VNFM, to scale up the VNF; and/or, when the measured value is less than the scale down threshold, determining, by the VNFM, to scale down the VNF; for the monitored performance measurement which requires more resources when the value of the monitored performance measurement is smaller, when the measured value is less than the scale up threshold, determining, by the VNFM, to scale up the VNF; and/or, when the measured value is greater than the scale down threshold, determining, by the VNFM, to scale down the VNF.

In one embodiment, obtaining, by the VNFM, the measured value of the monitored performance measurement of the VNF includes: receiving, by the VNFM, the monitored performance measurement of the VNF which is sent by the NM or the OSS through a Network Function Virtualization Orchestrator (NFVO), indicating, by the VNFM, a Virtualized Infrastructure Manager (VIM) to measure the monitored performance measurement of the VNF and obtain the measured value; or, receiving, by the VNFM, the measured value of the monitored performance measurement of the VNF sent by the EM.

In one embodiment, the performance monitoring threshold includes a performance warning threshold and a scale up/down threshold; after performing, by the VNFM, the scale up operation to the virtual resources of the VNF, the method further includes: failing, by the VNFM, to perform the scale up operation; comparing, by the VNFM, the measured value with a current performance warning threshold of the VNF, and when determining, by the VNFM, to warn, sending, by the VNFM, the performance warning threshold of the VNF to the NM or the OSS.

In one embodiment, after performing, by the VNFM, the scale up operation or the scale down operation to the VNF, further including: when the VNFM fails to perform the scale up operation or the scale down operation, sending, by the VNFM, the notification about failing to scale up or scale down the VNF to the NM or the OSS through the NFVO.

In one embodiment, the related information about virtual resources includes at least one of information about virtual resource capacity and information about the maximum processing capacity corresponding to the monitored performance measurement.

In one embodiment, the threshold policy is set with a ratio value required between the performance monitoring threshold and a value of the virtual resource capacity or the maximum processing capacity corresponding to the monitored performance measurement.

In view of this, another embodiment of the present disclosure also provides an EM system, which includes:

a first interface component to perform information interaction with a Network Management (NM) or an Operation Support System (OSS), including: receiving a threshold policy of a Virtual Network Function (VNF) performance monitoring threshold sent by the NM or the OSS; a second interface component to perform information interaction with the VNF; a third interface component to perform information interaction with a VNF Manager (VNFM); a threshold setting component to set a new performance monitoring threshold for the VNF according to the threshold policy and related information about virtual resources after the VNF is scaled up/down which is acquired from the second interface component or the third interface component, and the performance monitoring threshold includes at least one of a scale up/down threshold and a performance warning threshold.

In one embodiment, the first interface component is further arranged to perform information interaction with the NM or the OSS further includes the following steps: receiving an initial VNF performance monitoring threshold sent by the NM or the OSS; and notifying a new VNF performance monitoring threshold to the NM or the OSS.

In one embodiment, the first interface component is further arranged to receive a monitored performance measurement of the VNF sent by the NM or the OSS; the second interface component is further arranged to perform information interaction with the VNF includes the following step: indicating the VNF to measure the monitored performance measurement and obtain a measured value; the EM system further includes: a scale determining component to compare the measured value with a current scale up/down threshold of the VNF, and when determining to scale up or scale down the VNF, send a request message to the VNFM, so as to request the VNFM to perform a scale up operation or a scale down operation to the virtual resources of the VNF.

In one embodiment, the related information about virtual resources after the VNF is scaled up/down, which is acquired by the threshold setting component, includes at least one of information about virtual resource capacity and the maximum processing capacity corresponding to the monitored performance measurement after the VNF is scaled up/down.

In one embodiment, the threshold setting component is further arranged to set the new performance monitoring threshold for the VNF according to the threshold policy and the related information about virtual resources after the VNF is scaled up/down includes the following steps: calculating the new performance monitoring threshold according to at least one of a value of the virtual resource capacity and the maximum processing capacity corresponding to the monitored performance measurement after the VNF is scaled up/down and a ratio value set in the threshold policy.

In one embodiment, the scale up/down threshold includes at least one of a scale up threshold and a scale down threshold; the scale determining component is arranged to compare the measured value with the current scale up/down threshold of the VNF to determine whether to scale up or scale down the VNF includes the following steps: for the monitored performance measurement which requires more resources when a value of the monitored performance measurement is greater, when the measured value is greater than the scale up threshold, determining to scale up the VNF; and/or, when the measured value is less than the scale down threshold, determining to scale down the VNF; for the monitored performance measurement which requires more resources when the value of the monitored performance measurement is smaller, when the measured value is less than the scale up threshold, determining to scale up the VNF; and/or, when the measured value is greater than the scale down threshold, determining to scale down the VNF.

In one embodiment, the system further includes: a warning determining component to receive from the second interface component or the third interface component a notification about failing to scale up the VNF which is sent by the VNFM or the VNF, and compare the measured value with the current performance warning threshold of the VNF to determine whether to warn; the first interface component is further arranged to, when the warning determining component determines to warn, send a VNF performance warning notification to the NM or the OSS.

In one embodiment, the third interface component is further arranged to receive a notification about failing to scale up or scale down the VNF which is sent by the VNFM; the first interface component is further arranged to send the notification about failing to scale up or scale down the VNF to the NM or the OSS.

In view of this, another embodiment of the present disclosure also provides a VNFM system, which includes:

a first interface component to perform information interaction with a Network Management (NM) or an Operation Support System (OSS) through a Network Function Virtualization Orchestrator (NFVO), including: receiving a threshold policy of a Virtual Network Function (VNF) performance monitoring threshold which is sent by the NM or the OSS through the NFVO; a second interface component to perform information interaction with an Element Management (EM); a third interface component to perform information interaction with a Virtualized Infrastructure Manager (VIM); a threshold setting component to set a new performance monitoring threshold for the VNF according to the threshold policy and related information about virtual resources after the VNF is scaled up/down, and the performance monitoring threshold includes at least one of a scale up/down threshold and a performance warning threshold.

In one embodiment, the first interface component is arranged to perform information interaction with the NM or the OSS through the NFVO further includes the following steps: receiving an initial VNF performance monitoring threshold sent by the NM or the OSS through the NFVO, and notifying the new VNF performance monitoring threshold to the NM or the OSS through the NFVO.

In one embodiment, the system further includes: a scale determining component to compare an obtained measured value with a current scale up/down threshold of the VNF, and when determining to scale up or scale down the VNF, notify a scale performing component to perform a scale up operation or a scale down operation to the virtual resources of the VNF; and a scale performing component to perform the scale up operation or the scale down operation to the virtual resources of the VNF, and acquire the related information about virtual resources after the VNF is scaled up/down.

In one embodiment, the scale up/down threshold includes at least one of a scale up threshold and a scale down threshold; the scale determining component is arranged to compare the measured value with the current scale up/down threshold of the VNF to determine whether to scale up or scale down the VNF includes the following steps: for the monitored performance measurement which requires more resources when a value of the monitored performance measurement is greater, when the measured value is greater than the scale up threshold, determining to scale up the VNF; and/or, when the measured value is less than the scale down threshold, determining to scale down the VNF; for the monitored performance measurement which requires more resources when the value of the monitored performance measurement is smaller, when the measured value is less than the scale up threshold, determining to scale up the VNF; and/or, when the measured value is greater than the scale down threshold, determining to scale down the VNF.

In one embodiment, the second interface component is further arranged to receive the measured value of the monitored performance measurement of the VNF which is sent by the EM; or the first interface component is further arranged to receive the monitored performance measurement of the VNF which is sent by the NM or the OSS through the NFVO; the third interface component is further arranged to send to the VIM an instruction of measuring the monitored performance measurement of the VNF and obtaining the measured value.

In one embodiment, the second interface component is further arranged to, after the scale performing component performs the scale up operation or the scale down operation to the virtual resources of the VNF, send to the EM the related information about virtual resources after the VNF is scaled up/down.

In one embodiment, the performance monitoring threshold includes a performance warning threshold and a scale up/down threshold; the VNFM system further includes: a warning determining component to, when the scale performing component fails to perform the scale up operation, compare the measure value with the current performance warning threshold of the VNF to determine whether to warn; the first interface component is further arranged to, when the warning determining component determines to warn, send a VNF performance warning notification to the NM or the OSS.

In one embodiment, the first interface component is further arranged to, when the scale performing component fails to perform the scale up operation or the scale down operation, send the notification about failing to scale up or scale down the VNF to the NM or the OSS through the NFVO.

In one embodiment, the related information about virtual resources after the VNF is scaled up/down which is acquired by the threshold setting component includes at least one of information about virtual resource capacity and the maximum processing capacity corresponding to the monitored performance measurement after the VNF is scaled up/down.

In one embodiment, the threshold setting component, is arranged to set the new performance monitoring threshold for the VNF according to the threshold policy and the related information about virtual resources after the VNF is scaled up/down includes the following steps: calculating the new performance monitoring threshold according to at least one of a value of the virtual resource capacity and the maximum processing capacity corresponding to the monitored performance measurement after the VNF is scaled up/down and a ratio value set in the threshold policy.

The technical solution provided in at least some embodiments of the present disclosure implements dynamic adjustment of a performance monitoring threshold according to a resource condition of a VNF, and with the threshold policy, allows improved logicality and controllability in setting the monitoring threshold, thereby implementing improved effectiveness in resource allocation and reducing performance warning threshold warnings.

Other aspects are understood after the accompanying drawings and detailed description are read and understood.

DETAILED DESCRIPTION

For making the aim, the technical solutions and the advantages of the present disclosure more clear, embodiments are elaborated below in combination with the accompanying drawings and specific embodiments. Note that, embodiments and features in the embodiments in the application are combined with each other on condition of not conflicting.

The present disclosure is elaborated below in combination with the accompanying drawings. It should be understood that the specific embodiments described are used for illustrating the present disclosure and not intended to limit the present disclosure.

EMBODIMENT ONE

Figure 1:
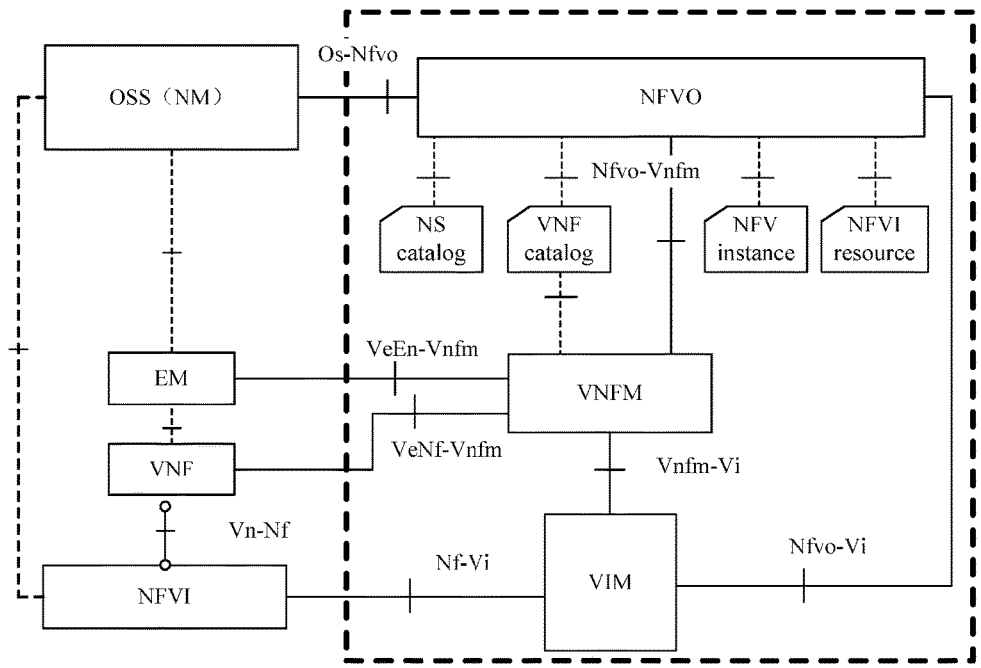
FIG. 1 is a schematic diagram of management architecture after network function virtualization in the related art.
Figure 2:
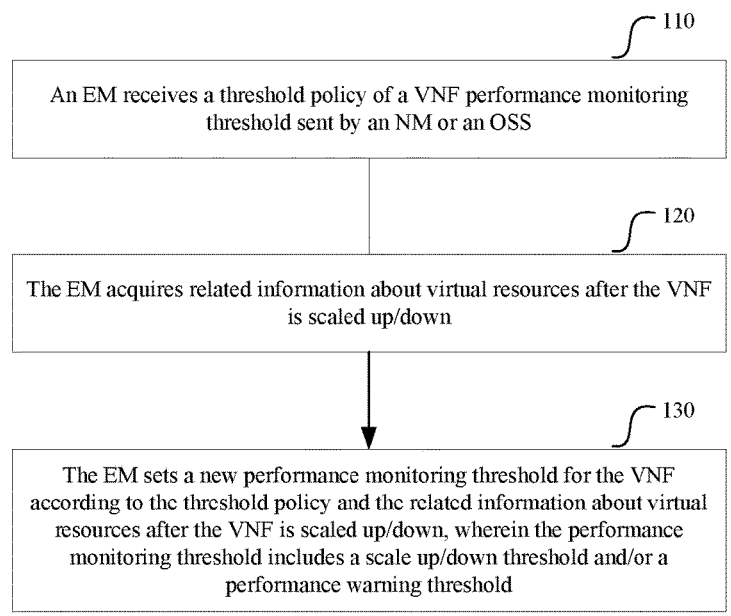
FIG. 2 is a flowchart of embodiment one of the present disclosure.

Refer to FIG. 2, the present embodiment implements update of a VNF performance monitoring threshold through an EM and as shown in FIG. 2, the flow of the present embodiment includes the following steps.

At step S110, an EM receives a threshold policy of a VNF performance monitoring threshold sent by an NM or an OSS.

In this step, the threshold policy is a policy about how a performance monitoring threshold corresponds to the maximum processing capacity corresponding to at least one of a virtual resource capacity and a monitored performance measurement. For example, the threshold policy is set with a ratio value required between the performance monitoring threshold and a value of the virtual resource capacity or the maximum processing capacity corresponding to the monitored performance measurement.

At step S120, the EM acquires related information about virtual resources after the VNF is scaled up/down.

In this step, the related information about virtual resources includes at least one of information about the virtual resource capacity and information about the maximum processing capacity corresponding to the monitored performance measurement.

In this step, the EM receives the related information about virtual resources after the VNF is scaled up/down which is sent by the VNFM or the VNF. The VNF is scaled up/down is the VNF is scaled up or scaled down.

At step S130, the EM sets a new performance monitoring threshold for the VNF according to the threshold policy and the related information about virtual resources after the VNF is scaled up/down, and the performance monitoring threshold includes at least one of a scale up/down threshold and a performance warning threshold. Setting is calculating according to the threshold policy, the virtual resource capacity or the maximum processing capacity. In short, if the threshold policy is a ratio relationship, according to (the capacity after scaling/the maximum processing capacity)*the ratio in the threshold policy, the calculated value is set as the new performance monitoring threshold of the corresponding measurement.

Based on the present embodiment, the EM updates the VNF performance monitoring threshold based on the threshold policy set by the NM or the OSS. During performance monitoring, the EM also receives an initial VNF performance monitoring threshold sent by the NM or the OSS (the EM also obtains the initial performance monitoring threshold by calculating according to the policy and an initial resource condition), and notifies the new VNF performance monitoring threshold to the NM or the OSS, so that the NM or the OSS either sets the initial performance monitoring threshold for the VNF, or obtains the current VNF performance monitoring threshold at any time. Note that, the present embodiment focuses on the update of the performance monitoring threshold, and does not limit the determining and performing of the VNF is scaled up/down.

EMBODIMENT TWO

Figure 3:
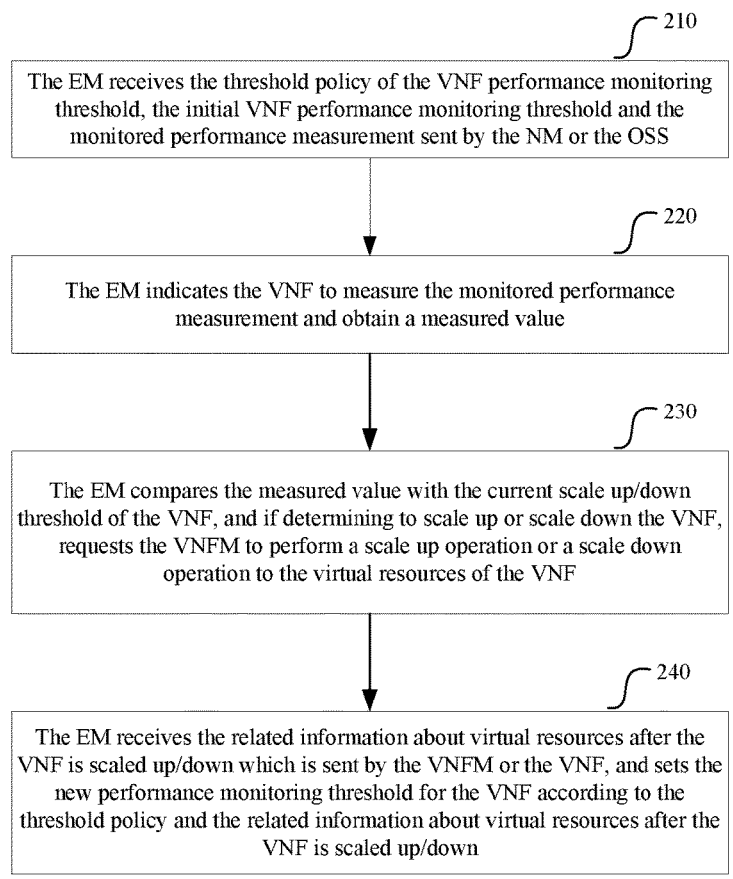
FIG. 3 is a flowchart of embodiment two of the present disclosure.

Refer to FIG. 3, the present embodiment implements, through the EM, the update and the scale determining of the VNF performance monitoring threshold; as shown in FIG. 3, the flow of the present embodiment includes the following steps.

At step S210, the EM receives the threshold policy of the VNF performance monitoring threshold, the initial VNF performance monitoring threshold and the monitored performance measurement sent by the NM or the OSS.

The performance monitoring threshold in the present embodiment at least includes a scale up/down threshold, and the scale up/down threshold includes at least one of a scale up threshold and a scale down threshold. The performance monitoring threshold also includes a performance warning threshold. The value of the performance warning threshold is equal to the value of the scale up threshold.

The monitored performance measurement is different according to the difference of the VNF. For example, the monitored performance measurement is the number of calls, the number of bytes per second, and so on. The monitored performance measurement is either specified and issued by the NM or the OSS, or configured and reported by the EM/VNFM.

In this step, the EM acquires the information from a message of creating performance threshold monitoring sent by the NE or the OSS. Note that, the specific message in this application is exemplary. Information transfer in the present embodiment is not limited to a specific message. For example, in this step, the EM also obtains the threshold policy from a message of setting the threshold policy sent by the NM or the OSS, and so on.

At step S220, the EM indicates the VNF to measure the monitored performance measurement and obtain a measured value.

The EM indicates the VNF to measure the monitored performance measurement by sending the message of creating performance threshold monitoring to the VNF.

At step S230, the EM compares the measured value with the current scale up/down threshold of the VNF, and if determining to scale up or scale down the VNF, requests the VNFM to perform a scale up operation or a scale down operation to the virtual resources of the VNF.

In the present embodiment, the scale up/down threshold includes the scale up threshold and the scale down threshold.

For the monitored performance measurement which requires more resources when a value of the monitored performance measurement is greater, if the measured value is greater than the scale up threshold, the EM determines to scale up the VNF;

and/or, if the measured value is less than the scale down threshold, the EM determines to scale down the VNF.

For the monitored performance measurement which requires more resources when the value of the monitored performance measurement is smaller, when the measured value is less than the scale up threshold, the EM determines to scale up the VNF; and/or, if the measured value is greater than the scale down threshold, the EM determines to scale down the VNF.

According to a system situation, the scale up/down threshold also includes one of the scale up threshold and the scale down threshold. In this situation, the scale up threshold or the scale down threshold is determined.

At step S240, the EM receives the related information about virtual resources after the VNF is scaled up/down which is sent by the VNFM or the VNF, and sets the new performance monitoring threshold for the VNF according to the threshold policy and the related information about virtual resources after the VNF is scaled up/down.

In this step, the EM acquires the related information about virtual resources after the VNF is scaled up/down from a response about succeeding in the scale up operation or the scale down operation which is sent by the VNFM. After the new performance monitoring threshold is set for the VNF, the EM notifies the new VNF performance monitoring threshold to the NM or the OSS. The EM also acquires the related information about virtual resources after the VNF is scaled up/down from the message sent by the VNF. Before that, the method includes that: the EM receives a notification about information change which is sent by the VNF after the scale up operation or the scale down operation is completed. And the EM requests the VNF for the related information about virtual resources after the VNF is scaled up/down.

In an exemplary embodiment, the threshold policy sets the ratio value required between the performance monitoring threshold and the value of the virtual resource capacity (or the maximum processing capacity corresponding to the monitored performance measurement). After the value of the virtual resource capacity (or the maximum processing capacity corresponding to the monitored performance measurement) is obtained, the new performance monitoring threshold is obtained by multiplying the value by the set ratio value. If what is limited by the threshold policy is the ratio value required between the value of the maximum processing capacity corresponding to the monitored performance measurement and the performance monitoring threshold, and the received related information about virtual resources is the value of the virtual resource capacity of the VNF, it is needed to first calculate the maximum processing capacity corresponding to the monitored performance measurement according to the virtual resource capacity after the VNF is scaled up/down, vice versa. Note that, in the present embodiment, a corresponding relationship between the virtual resource capacity of the VNF or the maximum processing capacity corresponding to the monitored performance measurement and the performance monitoring threshold is not limited to this. For example, it can also be a nonlinear corresponding relationship, or the correspondence between each value interval of the virtual resource capacity of the VNF or the maximum processing capacity corresponding to the monitored performance measurement and a group of performance monitoring thresholds. The corresponding relationship is expressed by either a formula or a table.

In the present embodiment, when the performance monitoring threshold includes the performance warning threshold, if the VNFM fails to perform the scale up operation, after receiving the notification about failing to scale up the VNF which is sent by the VNFM or the VNF, the EM compares the measured value with the current performance warning threshold of the VNF, and if determining to warn, sends a VNF performance warning notification to the NM or the OSS. The manner of comparing the measured value with the current performance warning threshold of the VNF to determine whether to warn is similar to the manner of comparing the measured value with the scale up/down threshold. That is, for the monitored performance measurement which requires more resources when the value of the monitored performance measurement is greater, warning when the measured value is greater than the performance warning threshold; for the monitored performance measurement which requires more resources when its value is smaller, warning when the measured value is less than the performance warning threshold.

In the present embodiment, if the VNFM fails to perform the scale up operation or the scale down operation, when receiving the notification about failing to scale up or scale down the VNF which is sent by the VNFM, the EM sends the notification about failing to scale up or scale down the VNF to the NM or the OSS.

EMBODIMENT THREE

Figure 4:
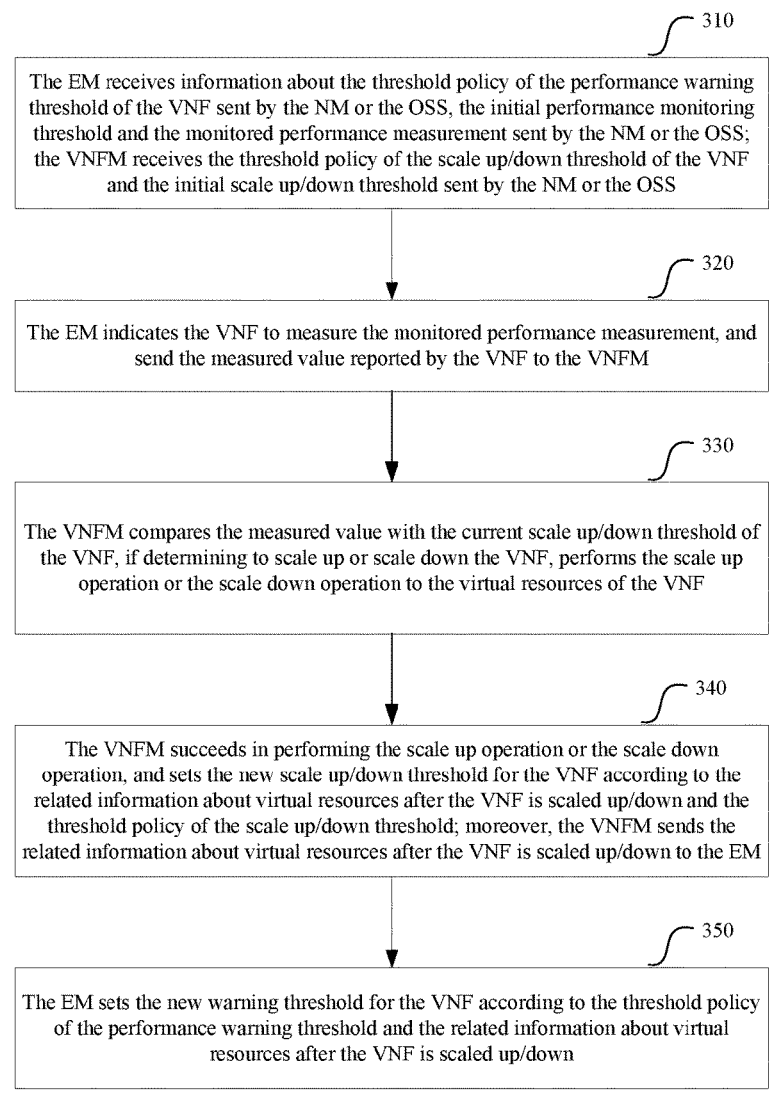
FIG. 4 is a flowchart of embodiment three of the present disclosure.

Refer to FIG. 4, the present embodiment completes the performance monitoring of virtual resources of the VNF through the coordination of the VNFM and the EM. The EM implements the update and warning of the performance warning threshold of the VNF, and the VNFM performs the scale determining and the update of the scale up/down threshold. As shown in FIG. 4, the flow of the present embodiment includes the following steps.

At step S310, the EM receives information about the threshold policy of the performance warning threshold of the VNF sent by the NM or the OSS, the initial performance monitoring threshold and the monitored performance measurement sent by the NM or the OSS. The VNFM receives the threshold policy of the scale up/down threshold of the VNF and the initial scale up/down threshold sent by the NM or the OSS.

The EM acquires the information from the message of creating performance warning threshold monitoring sent by the NM or the OSS.

At step S320, the EM indicates the VNF to measure the monitored performance measurement, and send the measured value reported by the VNF to the VNFM.

In the present embodiment, it is the EM indicating the VNF to measure and send the measured value to the VNFM. In another embodiment, the VNFM receives the monitored performance measurement which the NM or the OSS sends through the NFVO, and indicates the VIM to measure the monitored performance measurement of the VNF and obtain the measured value.

At step S330, the VNFM compares the measured value with the current scale up/down threshold of the VNF. If determining to scale up or scale down the VNF, the VNFM performs the scale up operation or the scale down operation to the virtual resources of the VNF.

In this step, the manner that the VNFM compares the measured value with the current scale up/down threshold of the VNF to determine whether to scale up or scale down the VNF is similar to the determining manner of the EM in the embodiment two, so it will not be repeated here.

At step S340, the VNFM succeeds in performing the scale up operation or the scale down operation, and sets the new scale up/down threshold for the VNF according to the related information about virtual resources after the VNF is scaled up/down and the threshold policy of the scale up/down threshold. Moreover, the VNFM sends the related information about virtual resources after the VNF is scaled up/down to the EM.

After setting the new scale up/down threshold for the VNF, the VNFM also notifies the new scale up/down threshold for the VNF to the NM or the OSS through the NFVO.

At step S350, the EM sets the new warning threshold for the VNF according to the threshold policy of the performance warning threshold and the related information about virtual resources after the VNF is scaled up/down.

In another embodiment, the EM also receives the related information about virtual resources after the VNF is scaled up/down sent by the VNF. After setting the new warning threshold for the VNF, the EM also notifies the new warning threshold of the VNF to the NM or the OSS.

If in step S340, the VNFM fails to perform the scale up operation, the EM receives the notification about failing to scale up the VNF which is sent by the VNFM or the VNF, and compares the measured value with the current performance warning threshold of the VNF, and if determining to warn, the VNFM sends the VNF performance warning notification to the NM or the OSS.

If in step S340, the VNFM fails to perform the scale up operation or the scale down operation, the VNFM sends the notification about failing to scale up or scale down the VNF to the NM or the OSS through the NFVO. Or, the VNFM sends the notification about failing to scale up or scale down the VNF to the EM. After receiving the notification, the EM sends the notification about failing to scale up or scale down the VNF to the NM or the OSS.

EMBODIMENT FOUR

Figure 5:
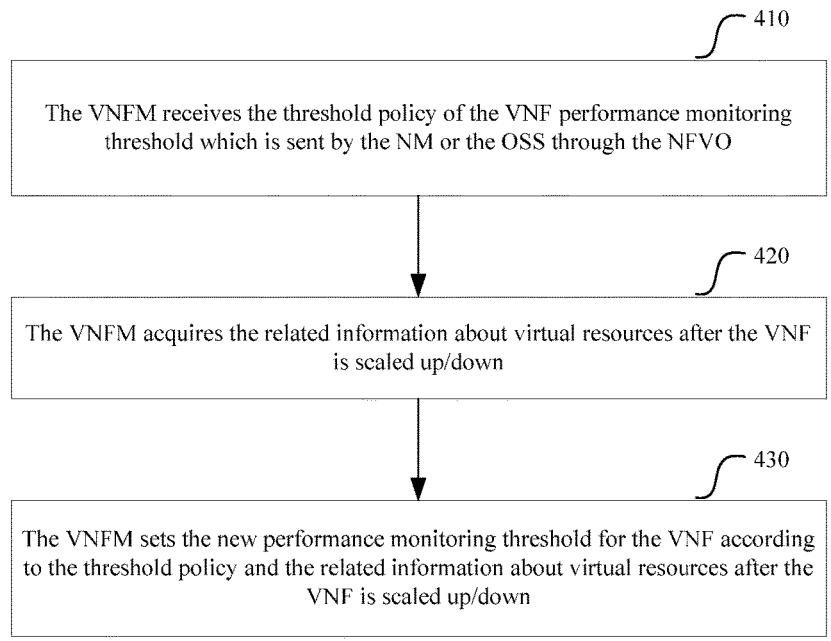
FIG. 5 is a flowchart of embodiment four of the present disclosure.

Refer to FIG. 5, the present embodiment implements VNF performance monitoring through the VNFM. As shown in FIG. 5, the flow of the present embodiment includes the following steps.

At step S410, the VNFM receives the threshold policy of the VNF performance monitoring threshold which is sent by the NM or the OSS through the NFVO.

In the present embodiment, the performance monitoring threshold includes the scale up/down threshold and the performance warning threshold, or one of the scale up/down threshold and the performance warning threshold.

At step S420, the VNFM acquires the related information about virtual resources after the VNF is scaled up/down.

In the present embodiment, the VNFM obtains the measured value of the monitored performance measurement of the VNF, compares the measured value with the current scale up/down threshold of the VNF, and if determining to scale up or scale down the VNF, performs the scale up operation or the scale down operation to the virtual resources of the VNF, so as to acquire the related information about virtual resources after the VNF is scaled up/down. The manner that the VNFM compares the measured value with the current scale up/down threshold of the VNF to determine whether to scale up or scale down the VNF is similar to the manner in the above embodiments, so it will not be repeated here.

The VNFM receives the information about the monitored performance measurement of the VNF which is sent by the NM or the OSS through the NFVO, and indicates the VIM to measure the monitored performance measurement of the VNF, so as to obtain the measured value. Moreover, the VNFM also receives the measured value of the monitored performance measurement of the VNF sent by the EM.

At step S430, the VNFM sets the new performance monitoring threshold for the VNF according to the threshold policy and the related information about virtual resources after the VNF is scaled up/down.

In the present embodiment, the related information about virtual resources includes the information about virtual resource capacity and/or the information about the maximum processing capacity corresponding to the monitored performance measurement. The threshold policy of the performance monitoring threshold sets the proportion value required between the performance monitoring threshold and the value of the virtual resource capacity or the maximum processing capacity corresponding to the monitored performance measurement.

In one embodiment, before setting the new performance monitoring threshold for the VNF, the VNFM receives the initial VNF performance monitoring threshold sent by the NM or the OSS through the NFVO; after setting the new performance monitoring threshold for the VNF, the VNFM notifies the new VNF performance monitoring threshold to the NM or the OSS through the NFVO.

In one embodiment, if the VNFM fails to perform the scale up operation, the VNFM compares the measured value with the current scale up/down threshold of the VNF, and if determining to warn, sends the VNF performance warning notification to the NM or the OSS.

In one embodiment, if the VNFM fails to perform the scale up operation or the scale down operation, the VNFO sends the notification about failing to scale up or scale down the VNF to the NM or the OSS through the NFVO.

EMBODIMENT FIVE

Figure 6:
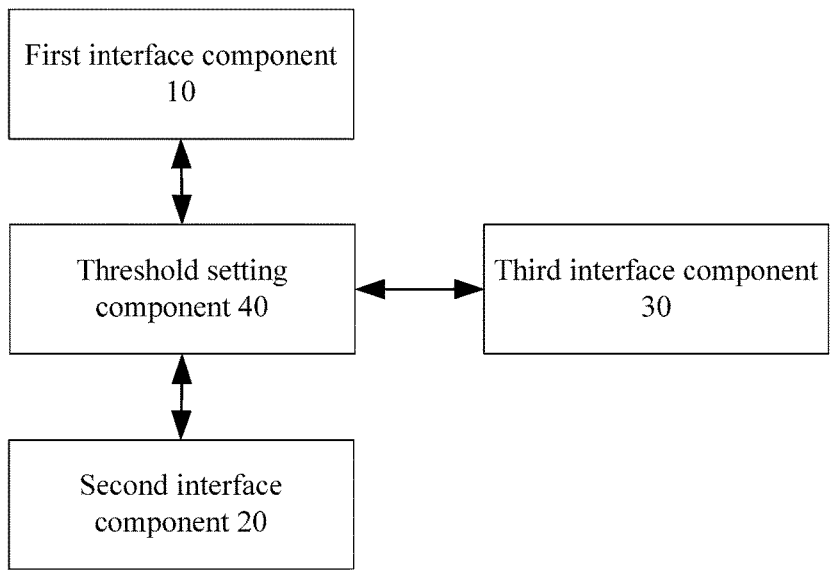
FIG. 6 is a component diagram of an EM system in embodiment five of the present disclosure.

Correspondingly, refer to FIG. 6, the present embodiment provides an EM system (which can be one or more devices with an EM function on the entity), which includes:

a first interface component 10 to perform information interaction with the NM or the OSS, including: receiving the threshold policy of the VNF performance monitoring threshold sent by the NM or the OSS;

a second interface component 20 to perform information interaction with the VNF;

a third interface component 30 to perform information interaction with the VNFM;

a threshold setting component 40 to set the new performance monitoring threshold for the VNF according to the threshold policy and the related information about virtual resources after the VNF is scaled up/down which is acquired from the second interface component or the third interface component, and the performance monitoring threshold includes at least one of the scale up/down threshold and the performance warning threshold.

In one embodiment, the first interface component is further arranged to perform information interaction with the NM or the OSS includes the following steps: receiving the initial VNF performance monitoring threshold sent by the NM or the OSS; and notifying the new VNF performance monitoring threshold to the NM or the OSS.

In one embodiment, the first interface component is further arranged to receive the monitored performance measurement of the VNF sent by the NM or the OSS. The second interface component is further arranged to indicate the VNF to measure the monitored performance measurement and obtain the measured value.

The EM system further includes: a scale determining component to compare the measured value with the current scale up/down threshold of the VNF, and if determine to scale up or scale down the VNF, send the request message to the VNFM, so as to request the VNFM to perform the scale up operation or the scale down operation to the virtual resources of the VNF.

In one embodiment, the related information about virtual resources after the VNF is scaled up/down, which is acquired by the threshold setting component, includes at least one of the information about virtual resource capacity and the maximum processing capacity corresponding to the monitored performance measurement after the VNF is scaled up/down.

In one embodiment, the threshold setting component is arranged to set the new performance monitoring threshold for the VNF according to the threshold policy and the related information about virtual resources after the VNF is scaled up/down includes the following: calculating the new performance monitoring threshold according to at least one of the value of the virtual resource capacity and the maximum processing capacity corresponding to the monitored performance measurement after the VNF is scaled up/down and the proportion value set in the threshold policy.

In one embodiment, the scale up/down threshold includes at least one of the scale up threshold and the scale down threshold.

The scale determining component is further arranged to compare the measured value with the current scale up/down threshold of the VNF to determine whether to scale up or scale down the VNF includes the following steps:

for the monitored performance measurement which requires more resources when a value of the monitored performance measurement is greater, when the measured value is greater than the scale up threshold, determining to scale up the VNF; and/or, when the measured value is less than the scale down threshold, determining to scale down the VNF;

for the monitored performance measurement which requires more resources when the value of the monitored performance measurement is smaller, when the measured value is less than the scale up threshold, determining to scale up the VNF; and/or, when the measured value is greater than the scale down threshold, determining to scale down the VNF.

In one embodiment, the EM system further includes:

a warning determining component to receive from the second interface component or the third interface component the notification about failing to scale up the VNF which is sent by the VNFM or the VNF, and compare the measured value with the current performance warning threshold of the VNF to determine whether to warn. The first interface component is further arranged to, when the warning determining component determines to warn, send the VNF performance warning notification to the NM or the OSS.

In one embodiment, the third interface component is further arranged to receive the notification about failing to scale up or scale down the VNF which is sent by the VNFM.

The first interface component is further arranged to send the notification about failing to scale up or scale down the VNF to the NM or the OSS.

EMBODIMENT SIX

Figure 7:
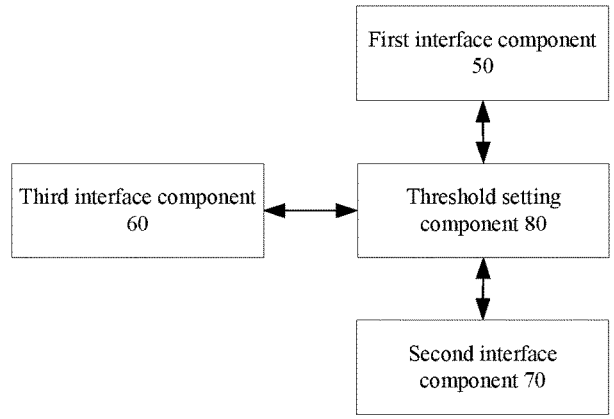
FIG. 7 is a component diagram of a VNFM system in embodiment six of the present disclosure.

Correspondingly, refer to FIG. 7, the present embodiment provides a VNFM system (which is one or more devices with a VNFM function on the entity), which includes:

a first interface component 50 to perform information interaction with the NM or the OSS the NFVO, including: receiving the threshold policy of the VNF performance monitoring threshold which is sent by the NM or the OSS through the NFVO;

a second interface component 60 to perform information interaction with the EM;

a third interface component 70 to perform information interaction with the VIM;

a threshold setting component 80 to set the new performance monitoring threshold for the VNF according to the threshold policy and the related information about virtual resources after the VNF is scaled up/down, and the performance monitoring threshold includes at least one of the scale up/down threshold and the performance warning threshold.

In one embodiment, the first interface component is arranged to receive the initial VNF performance monitoring threshold sent by the NM or the OSS through the NFVO, and notify the new VNF performance monitoring threshold to the NM or the OSS through the NFVO.

In one embodiment, the VNFM system further includes:

a scale determining component to compare the obtained measured value with the current scale up/down threshold of the VNF, and if determine to scale up or scale down the VNF, notify the scale performing component to perform the scale up operation or the scale down operation to the virtual resources of the VNF; and a scale performing component to perform the scale up operation or the scale down operation to the virtual resources of the VNF, and acquire the related information about virtual resources after the VNF is scaled up/down.

In one embodiment, the scale up/down threshold includes at least one of the scale up threshold and the scale down threshold.

The scale determining component is further arranged to compare the measured value with the current scale up/down threshold of the VNF to determine whether to scale up or scale down the VNF includes the following steps:

for the monitored performance measurement which requires more resources when a value of the monitored performance measurement is greater, when the measured value is greater than the scale up threshold, determining to scale up the VNF; and/or, when the measured value is less than the scale down threshold, determining to scale down the VNF;

for the monitored performance measurement which requires more resources when the value of the monitored performance measurement is smaller, when the measured value is less than the scale up threshold, determining to scale up the VNF; and/or, when the measured value is greater than the scale down threshold, determining to scale down the VNF.

In one embodiment, the second interface component is arranged to receive the measured value of the monitored performance measurement of the VNF which is sent by the EM; or the first interface component is further arranged to receive the monitored performance measurement of the VNF which is sent by the NM or the OSS through the NFVO. The third interface component is further arranged to send an instruction of measuring the monitored performance measurement of the VNF and obtaining the measured value to the VIM.

In one embodiment, the second interface component is arranged to, after the scale performing component performs the scale up operation or the scale down operation to the virtual resources of the VNF, send the related information about virtual resources after the VNF is scaled up/down to the EM.

In one embodiment, the performance monitoring threshold includes the performance warning threshold and the scale up/down threshold;

the VNFM system further includes: a warning determining component to, when the scale performing component fails to perform the scale up operation, compare the measure value with the current performance warning threshold of the VNF to determine whether to warn. The the first interface component is further arranged to, when the warning determining component determines to warn, send the VNF performance warning notification to the NM or the OSS.

In one embodiment, the first interface component is further arranged to, when the scale performing component fails to perform the scale up operation or the scale down operation, send the notification about failing to scale up or scale down the VNF to the NM or the OSS through the NFVO.

In one embodiment, the related information about virtual resources after the VNF is scaled up/down which is acquired by the threshold setting component includes at least one of the information about virtual resource capacity and the maximum processing capacity corresponding to the monitored performance measurement after the VNF is scaled up/down.

In one embodiment, the threshold setting component is further arranged to set the new performance monitoring threshold for the VNF according to the threshold policy and the related information about virtual resources after the VNF is scaled up/down includes the following step: calculating the new performance monitoring threshold according to at least one of the value of the virtual resource capacity and the maximum processing capacity corresponding to the monitored performance measurement after the VNF is scaled up/down and the proportion value set in the threshold policy.

An elaboration is given below through several application examples.

EXAMPLE 1

Figure 8:
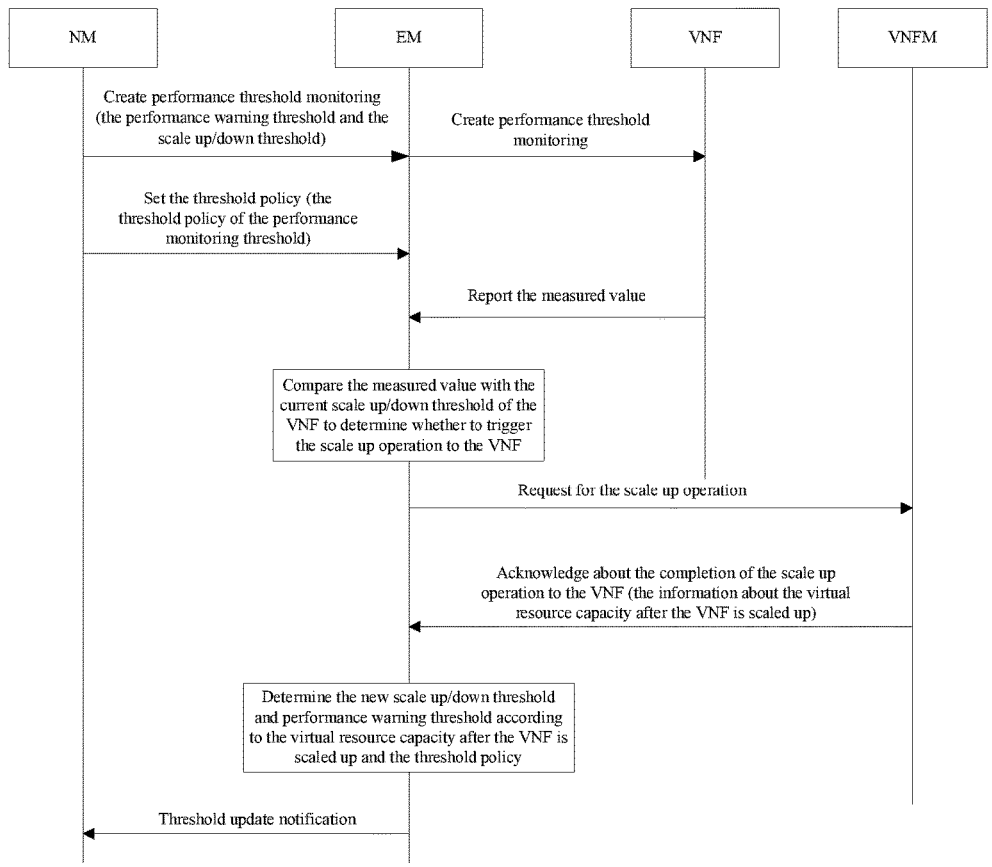
FIG. 8 is a schematic diagram of a signaling flow in example one of the present disclosure.

In the example, VNF performance monitoring is implemented by the EM, the scale up operation is determined to be performed, and the implementation of the operation is successful, and a resource change situation after the VNF is scaled up is returned. FIG. 8 shows a signaling flow of the example as follows.

The NM sends to the EM the initial VNF performance monitoring threshold (the performance warning threshold and the scale up/down threshold), and the information about the monitored performance measurement and the threshold policy of the performance monitoring threshold.

The performance warning threshold and the scale up/down threshold and the information about the monitored performance measurement are carried by means of the message of creating performance threshold monitoring, and the threshold policy is carried by means of a message of setting the threshold policy.

The EM sends the message of creating performance threshold monitoring to the VNF to indicate the VNF to measure the monitored performance measurement.

The VNF reports the measured value of the monitored performance measurement.

The EM compares the measured value with the current scale up/down threshold of the VNF to determine whether to trigger the scale operations to the VNF. When the determination result is to trigger the scale up operation, the EM sends a request for scale up operation to the VNFM.

The VNFM sends to the EM an acknowledge message about the completion of the scale up operation to the VNF, which means the success of the scale up operation; the message carries the information about the virtual resource capacity after the VNF is scaled up.

The EM determines the new scale up/down threshold and performance warning threshold according to the virtual resource capacity after the VNF is scaled up and the threshold policy.

In the example, if what is set by the threshold policy is the ratio value required between the value of the maximum processing capacity corresponding to the monitored performance measurement and the performance monitoring threshold, the EM first calculates the maximum processing capacity corresponding to the monitored performance measurement after the VNF is scaled up according to the virtual resource capacity and the maximum processing capacity corresponding to the monitored performance measurement before the VNF is scaled up. And the virtual resource capacity after the VNF is scaled up, and then calculates the new scale up/down threshold and performance warning threshold according to the maximum processing capacity corresponding to the monitored performance measurement after the VNF is scaled up and the threshold policy.

The maximum processing capacity corresponding to the monitored performance measurement after the VNF is scaled up=(the virtual resource capacity after the VNF is scaled up× the maximum processing capacity corresponding to the monitored performance measurement before the VNF is scaled up)/the virtual resource capacity before the VNF is scaled up.

The EM sends a threshold update notification to the NM, and the notification carries the new scale up/down threshold and performance warning threshold.

EXAMPLE TWO

Figure 9:
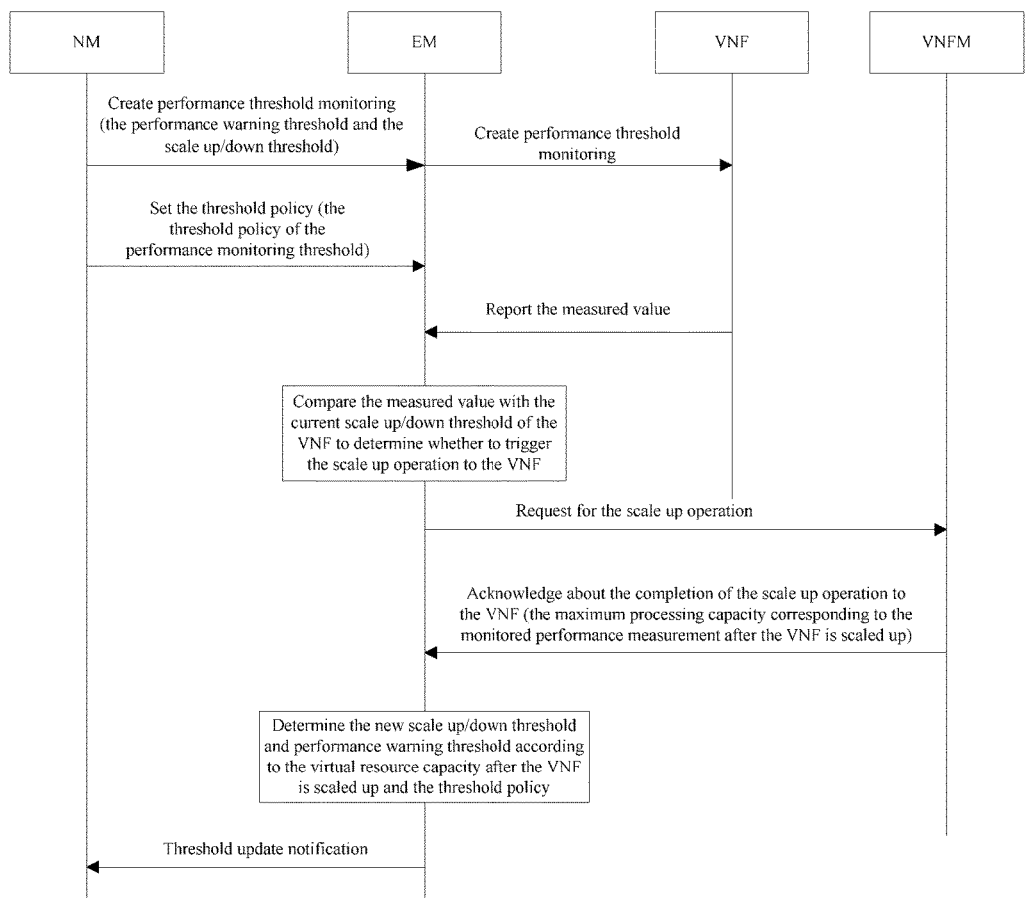
FIG. 9 is a schematic diagram of a signaling flow in example two of the present disclosure.

In the example, VNF performance monitoring is implemented by the EM, the scale up operation is determined to be performed, and the implementation of the operation is successful, and the information about the maximum processing capacity is returned. FIG. 9 shows a signaling flow of the example as follows.

The NM sends to the EM the message of creating performance threshold monitoring, and the message carries the initial VNF performance monitoring threshold (the performance warning threshold and the scale up/down threshold) and the information about the monitored performance measurement. The NM sends to the EM the message of setting the threshold policy, and the message carries the threshold policy of the VNF performance monitoring threshold;

The EM sends the message of creating performance threshold monitoring to the VNF to indicate the VNF to measure the monitored performance measurement.

The VNF reports the measured value of the monitored performance measurement.

The EM compares the measured value with the current scale up/down threshold of the VNF to determine whether to trigger the scale operations to the VNF. When the determination result is to trigger the scale up operation, the EM sends the request for scale up operation to the VNFM.

The VNFM sends to the EM the acknowledge message about the completion of the scale up operation to the VNF, which means the success of the scale up operation; the message carries the information about the processing capacity corresponding to the monitored performance measurement after the VNF is scaled up.

The EM determines the new scale up/down threshold and performance warning threshold according to the information about the maximum processing capacity corresponding to the monitored performance measurement after the VNF is scaled up and the threshold policy.

In the example, if what is set by the threshold policy is the ratio value required between the value of the maximum processing capacity corresponding to the monitored performance measurement and the performance monitoring threshold, the EM can obtain the new scale up/down threshold and performance warning threshold by directly multiplying the ratio value by the obtained the value of the maximum processing capacity corresponding to the monitored performance measurement after the VNF is scaled up.

The EM sends the threshold update notification to the NM, and the notification carries the new scale up/down threshold and performance warning threshold.

EXAMPLE THREE

Figure 10:
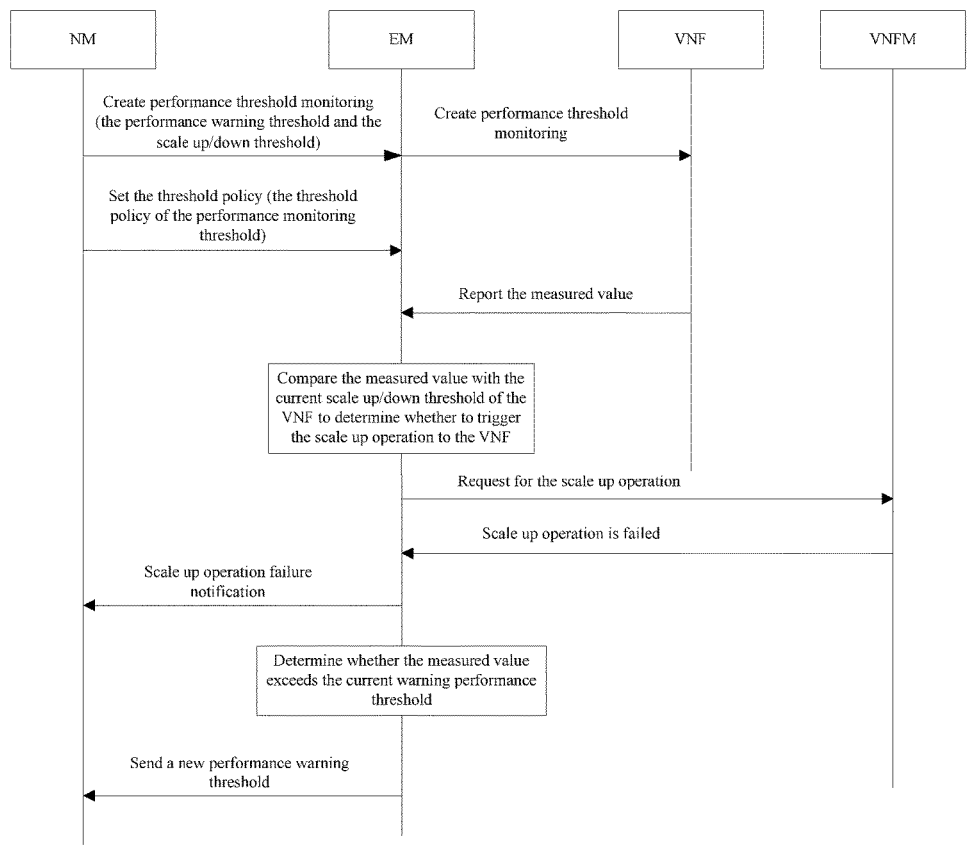
FIG. 10 is a schematic diagram of a signaling flow in example three of the present disclosure.

In the example, VNF performance monitoring is implemented by the EM, and the scale up operation is determined to be performed, but the implementation of the operation is failed. FIG. 10 shows a signaling flow of the example as follows.

The NM sends to the EM the message of creating performance threshold monitoring, and the message carries the initial VNF performance monitoring threshold (the performance warning threshold and the scale up/down threshold) and the information about the monitored performance measurement. The NM sends to the EM the message of setting the threshold policy, and the message carries the threshold policy of the VNF performance monitoring threshold.

The EM sends the message of creating performance threshold monitoring to the VNF to indicate the VNF to measure the monitored performance measurement.

The VNF reports the measured value of the monitored performance measurement.

The EM compares the measured value with the current scale up/down threshold of the VNF to determine whether to trigger the scale operations to the VNF. When the determination result is to trigger the scale up operation, the EM sends the request for scale up operation to the VNFM.

The VNFM sends to the EM a message about the failure of the scale up operation to the VNF.

The EM sends to the NM a notification message about the failure of the scale up operation to the VNF.

If determining that the measured value exceeds the current performance warning threshold, the EM sends the VNF performance warning notification to the NM, and the VNF performance warning notification is a new performance warning notification.

In the example, the greater the measured value of the monitored performance measurement is, the more the required resources are, so warning is performed when the measured value exceeds the current performance warning threshold.

EXAMPLE FOUR

Figure 11:
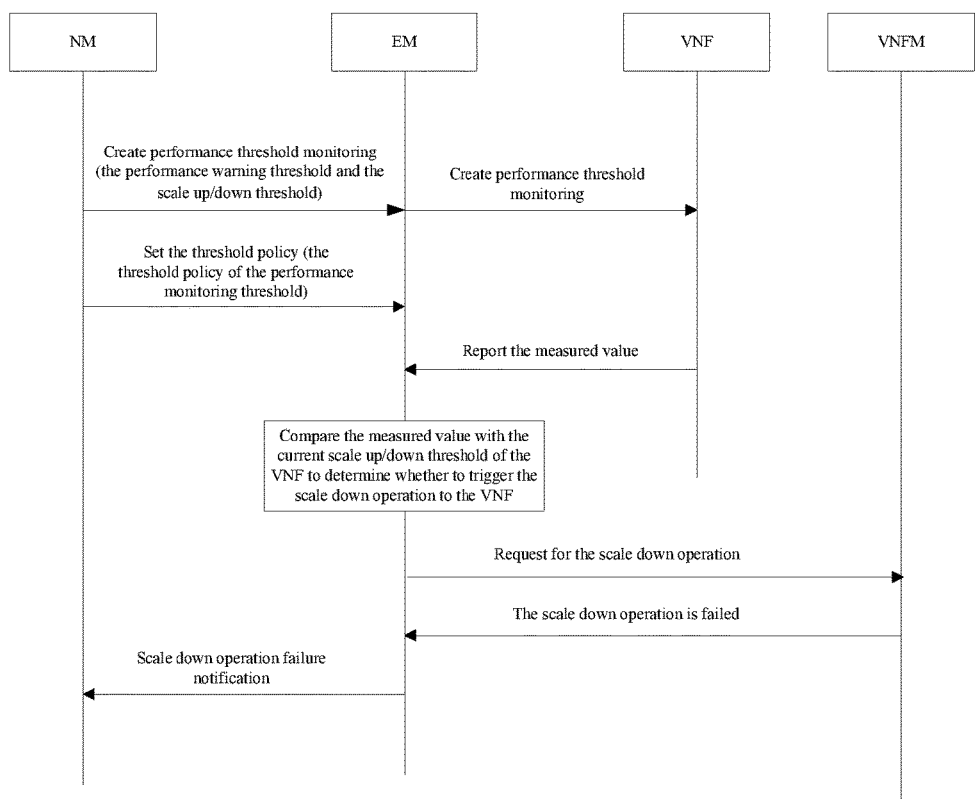
FIG. 11 is a schematic diagram of a signaling flow in example four of the present disclosure.

In the example, VNF performance monitoring is implemented by the EM, and the scale down operation is determined to be performed, but the implementation of the operation is failed. FIG. 11 shows a signaling flow of the example as follows.

The NM sends to the EM the message of creating performance threshold monitoring, and the message carries the initial VNF performance monitoring threshold (the performance warning threshold and the scale up/down threshold) and the information about the monitored performance measurement. The NM sends to the EM the message of setting the threshold policy, and the message carries the threshold policy of the VNF performance monitoring threshold.

The EM sends the message of creating performance threshold monitoring to the VNF to indicate the VNF to measure the monitored performance measurement.

The VNF reports the measured value of the monitored performance measurement.

The EM compares the measured value with the current scale up/down threshold of the VNF to determine whether to trigger the scale operations to the VNF. When the determination result is to trigger the scale down operation, the EM sends a request for scale down operation to the VNFM.

The VNFM sends to the EM a message about the failure of the scale down operation to the VNF.

The EM sends to the NM a notification message about the failure of the scale down operation to the VNF.

EXAMPLE FIVE

Figure 12:
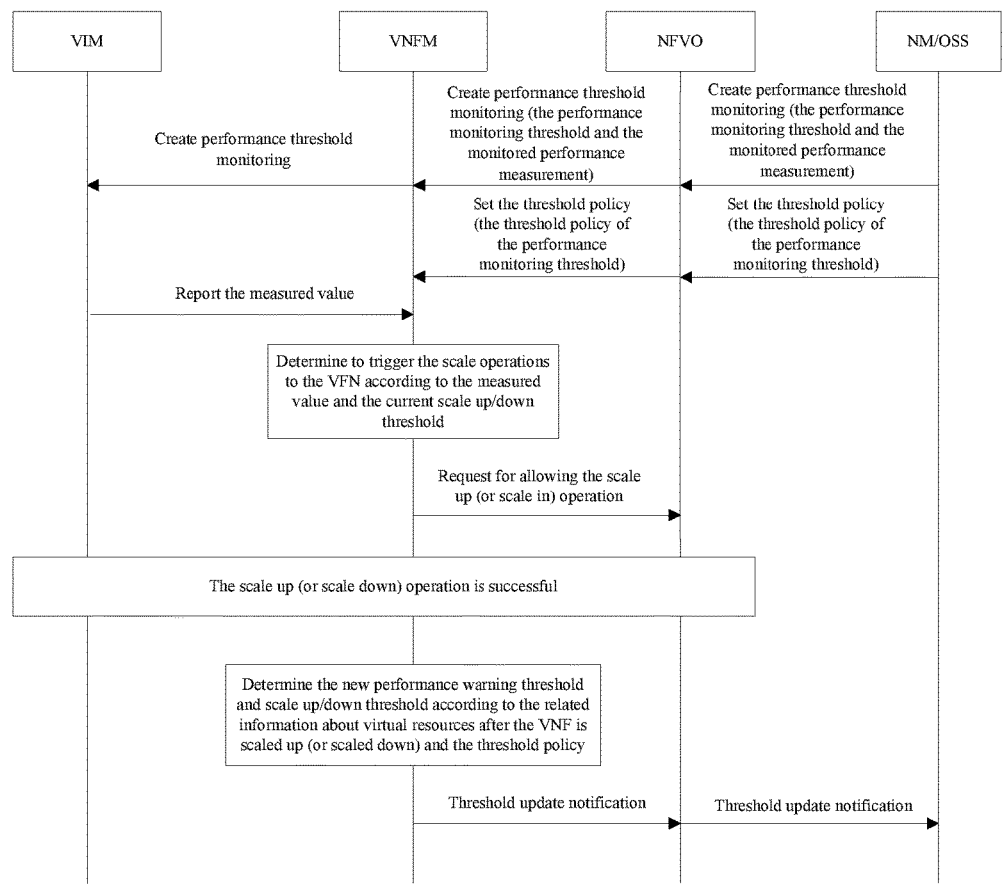
FIG. 12 is a schematic diagram of a signaling flow in example five of the present disclosure.

In the example, VNF performance monitoring is implemented by the VNFM, and the scale up operation is determined to be performed, and the implementation of the operation is successful. FIG. 12 shows a signaling flow of the example as follows.

The NM or the OSS sends the message of creating performance threshold monitoring to the NFVO, and the message carries the initial VNF performance monitoring threshold (the performance warning threshold and the scale up/down threshold) and the monitored performance measurement. The NM sends the message of setting the threshold policy to the NFVO, and the message carries the set threshold policy.

The NFVO sends the message of creating performance threshold monitoring to the VNFM, and the message carries the initial VNF performance monitoring threshold and the information about the monitored performance measurement. The NFVO sends the message of setting the threshold policy to the VNFM, and the message carries the set threshold policy.

The VNFM sends the message of creating performance threshold monitoring to the VIM to indicate the VIM to measure the monitored performance measurement of the VNF.

The VIM reports the measured value of the monitored performance measurement of the VNF to the VNFM.

The VNFM compares the measured with the current scale up/down threshold of the VNF to determine whether to trigger the scale operations. When the determination result is to trigger the scale up (or scale down) operation to the VNF, the VNFM sends a request for allowing the scale up (or scale down) operation to the NFVO; refer to relevant standards (which include multiple messages) for the interaction between the VNFM and the NFVO.

After succeeding in performing the scale up (or scale down) operation, the VNFM determines the new performance warning threshold and scale up/down threshold according to the related information about virtual resources after the VNF is scaled up (or scaled down) and the threshold policy.

The VNFM sends the threshold update notification to the NFVO, and the notification carries the new performance warning threshold and scale up/down threshold.

The NFVO sends the threshold update notification to the NM or the OSS, and the notification carries the new performance warning threshold and scale up/down threshold.

EXAMPLE SIX

Figure 13:
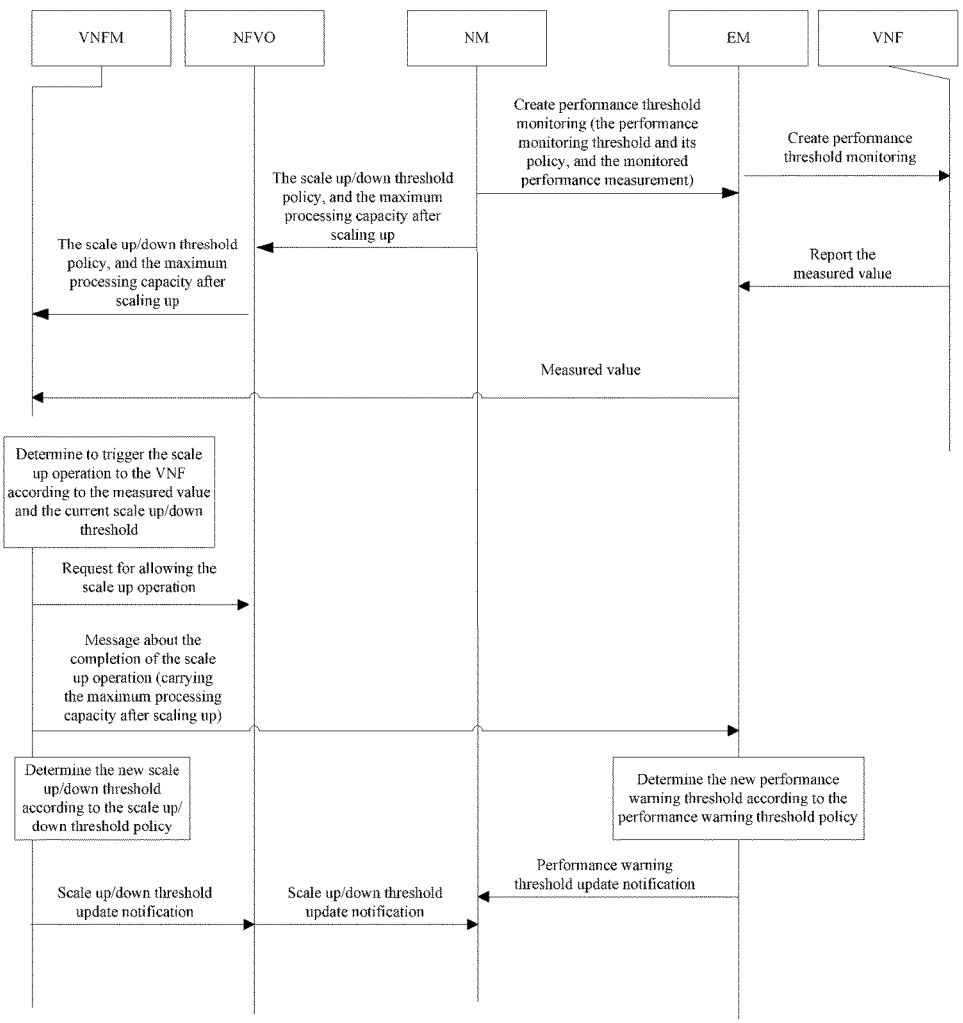
FIG. 13 is a schematic diagram of a signaling flow in example six of the present disclosure.

In the example, VNF performance monitoring is implemented by the EM, and the scale up operation is determined to be performed, but the implementation of the operation is failed. FIG. 13 shows a signaling flow of the example as follows.

The NM or the OSS sends the message of creating performance threshold monitoring to the NFVO, and the message carries the initial VNF performance monitoring threshold (the performance warning threshold and the scale up/down threshold) and the monitored performance measurement. The NM sends the message of setting the threshold policy to the NFVO, and the message carries the set threshold policy.

The NFVO sends the message of creating performance threshold monitoring to the VNFM, and the message carries the initial VNF performance monitoring threshold and the information about the monitored performance measurement. The NFVO sends the message of setting the threshold policy to the VNFM, and the message carries the set threshold policy.

The VNFM sends the message of creating performance threshold monitoring to the VIM to indicate the VIM to measure the monitored performance measurement of the VNF.

The VIM reports the measured value of the monitored performance measurement of the VNF to the VNFM.

The VNFM compares the measured with the current scale up/down threshold of the VNF to determine whether to trigger the scale operations. When the determination result is to trigger the scale up operation to the VNF, the VNFM sends the request for allowing the scale up operation to the NFVO; refer to relevant standards for the interaction between the VNFM and the NFVO.

After failing to performing the scale up operation, the VNFM determines whether the measured value of the monitored performance measurement exceeds the performance warning threshold. When the measured value of the monitored performance measurement exceeds the performance warning threshold, the VNFM sends the performance warning notification of the VNF to the NFVO.

The NFVO sends the performance warning notification of the VNF to the NM or the OSS.

EXAMPLE SEVEN

Figure 14:
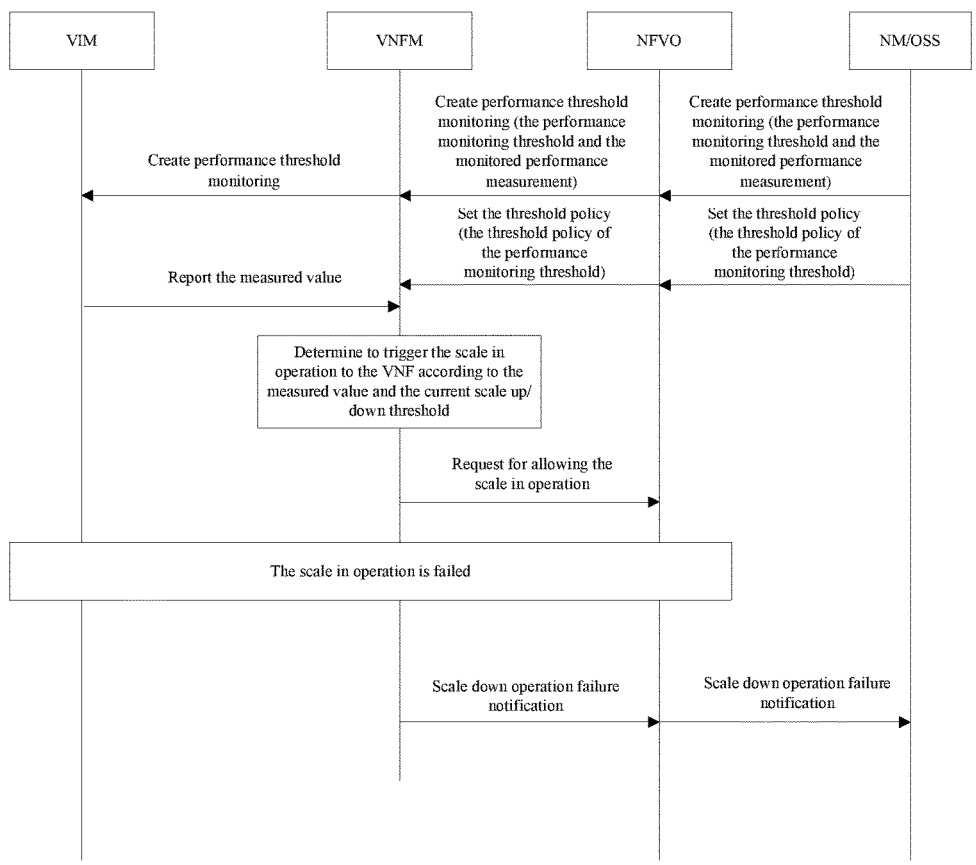
FIG. 14 is a schematic diagram of a signaling flow in example seven of the present disclosure.

In the example, VNF performance monitoring is implemented by the VNFM, and the scale down operation is determined to be performed, and the implementation of the operation is failed. FIG. 14 shows a signaling flow of the example as follows.

The NM or the OSS sends the message of creating performance threshold monitoring to the NFVO, and the message carries the initial VNF performance monitoring threshold (the performance warning threshold and the scale up/down threshold) and the monitored performance measurement. The NM sends the message of setting the threshold policy to the NFVO, and the message carries the set threshold policy.

The NFVO sends the message of creating performance threshold monitoring to the VNFM, and the message carries the initial VNF performance monitoring threshold and the information about the monitored performance measurement. The NFVO sends the message of setting the threshold policy to the VNFM, and the message carries the set threshold policy;

The VNFM sends the message of creating performance threshold monitoring to the VIM to indicate the VIM to measure the monitored performance measurement of the VNF.

The VIM reports the measured value of the monitored performance measurement of the VNF to the VNFM.

The VNFM compares the measured with the current scale up/down threshold of the VNF to determine whether to trigger the scale operations. When the determination result is to trigger the scale down operation to the VNF, the VNFM sends a request for allowing the scale down operation to the NFVO; refer to relevant standards for the interaction between the VNFM and the NFVO.

After failing to perform the scale down operation, the VNFM sends a message about the failure of the scale down operation to the NFVO.

The NFVO sends the message about the failure of the scale down operation to the NM or the OSS.

EXAMPLE EIGHT

Figure 15:
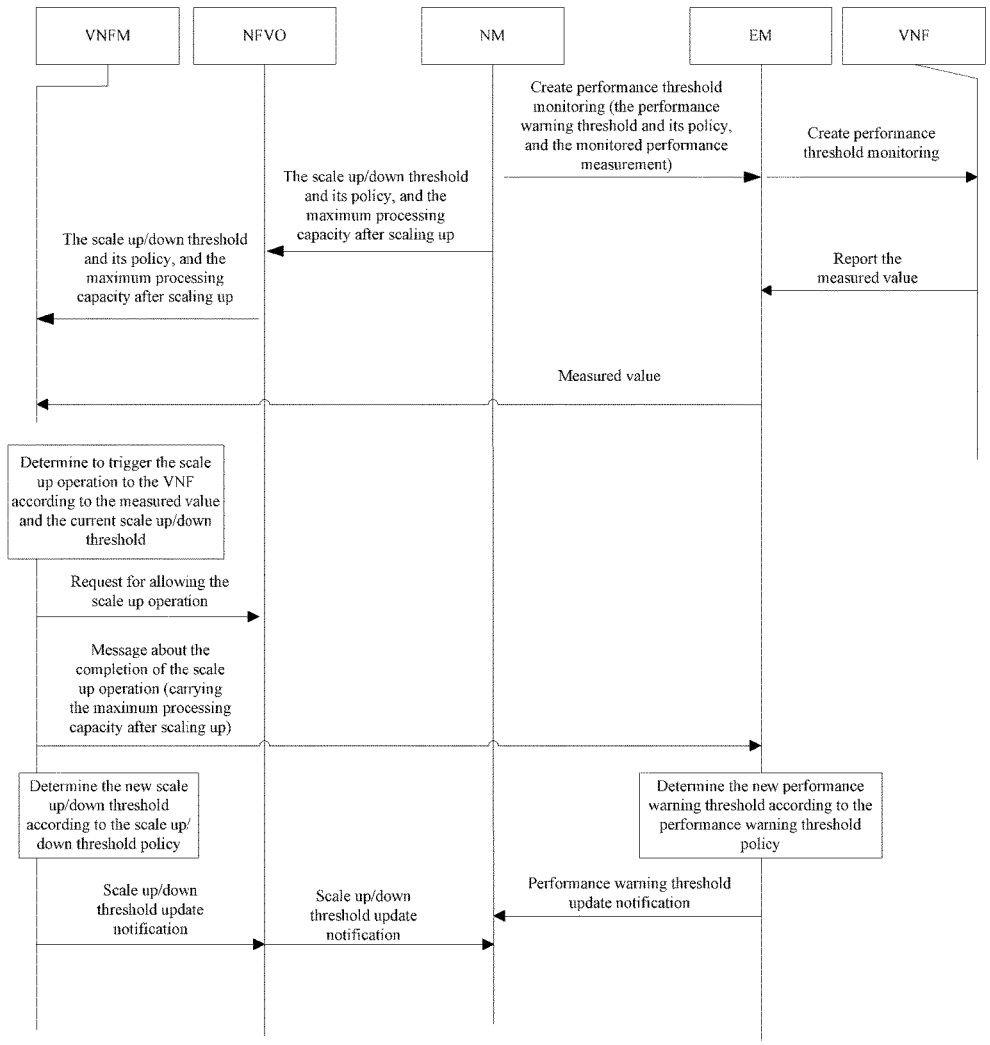
FIG. 15 is a schematic diagram of a signaling flow in example eight of the present disclosure.

In the example, VNF performance monitoring is implemented by the EM and the VNFM together, the scale up operation is determined to be performed, and the implementation of the operation is successful, and the maximum processing capacity is returned. FIG. 15 shows a signaling flow of the example as follows.

The NM sends the message of creating performance threshold monitoring to the EM, and the message carries the performance warning threshold and its threshold policy set for the VNF, and the monitored performance measurement. The NM sends to the NFVO the initial scale up/down threshold and the threshold policy set for the VNF, and the maximum processing capacity corresponding to the monitored performance measurement after the VNF is scaled up.

The NFVO sends to the VNFM the received scale up/down threshold and its threshold policy, and the maximum processing capacity corresponding to the monitored performance measurement.

The EM sends the message of creating performance threshold monitoring to the VNF to indicate the VNF to measure the monitored performance measurement.

The VNF reports the measured value of the monitored performance measurement to the EM, and then the EM sends the measured value to the VNFM.

The VNFM determines whether to trigger the scale operations according to the measured value and the current scale up/down threshold of the VNF. When the determination result is to trigger the scale up operation, the VNFM sends the request for allowing the scale up operation to the NFVO; refer to relevant standards for the interaction between the VNFM and the NFVO.

After completing the scale up operation to the VNF, the VNFM sends the message about the completion of the scale up operation to the EM, and the message carries the maximum processing capacity corresponding to the monitored performance measurement after the VNF is scaled up. The VNFM determines the new scale up/down threshold in combination with the scale up/down threshold policy, and sends a scale up/down threshold update notification to the NM through the NFVO.

The EM determines the new performance warning threshold according to the performance warning threshold policy, and sends a performance warning threshold update notification to the NM.

EXAMPLE NINE

Figure 16:
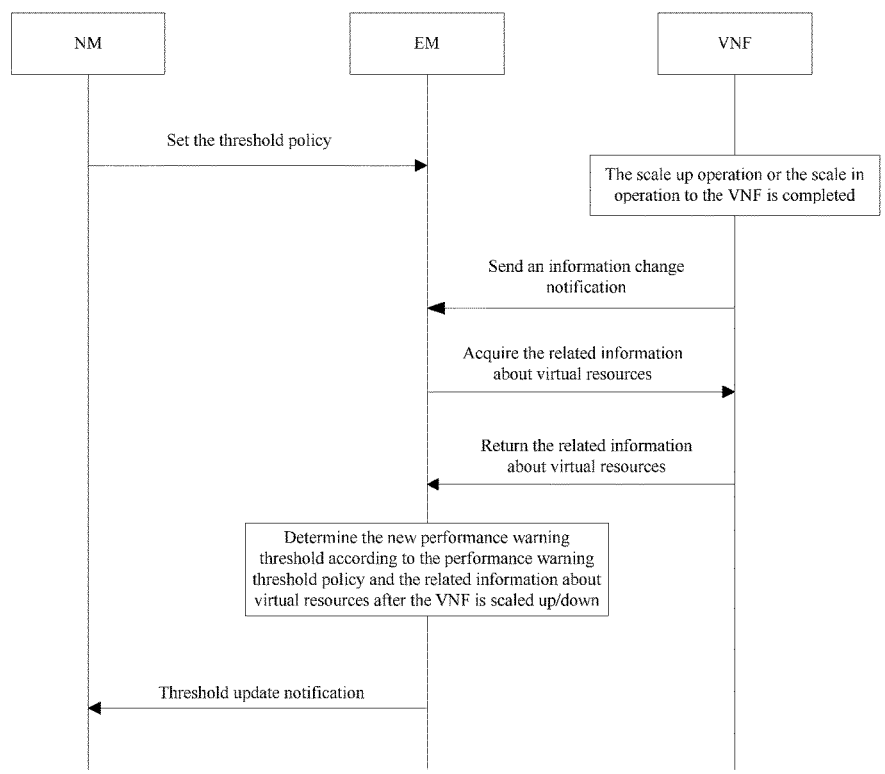
FIG. 16 is a schematic diagram of a signaling flow in example nine of the present disclosure.

In the example, the EM acquires from the VNF the resource change situation after the VNF is scaled up. FIG. 16 shows a signaling flow of the example as follows.

The NM sends the message of setting the threshold policy to the EM, and the message carries the set threshold policy.

The VNF sends the information change notification to the EM after the scale up operation or the scale operation is completed.

This example omits the content related to determining and performing the scale up operation or the scale down operation to the VNF; refers to the above embodiments and examples for the content.

The EM sends a message to acquire the related information about virtual resources after the VNF is scaled up/down, for example, the information about the maximum processing capacity corresponding to the monitored performance measurement after the VNF is scaled up/down or the information about the virtual resource capacity.

The VNF returns the related information about virtual resources after the VNF is scaled up/down.

The EM determines the new performance warning threshold according to the performance warning threshold and the related information about virtual resources after the VNF is scaled up/down.

The EM sends the threshold update notification to the NM, and the notification carries the performance warning threshold.

EXAMPLE TEN

The VNF in the example is a vPGW (which can correspond to a PGW entity); the virtual resource condition of the vPGW is assumed as: a control plane VDU needs 3 Virtual Management Services (VMs), and the virtual resource condition of each VM is 4 GB vRAM, 2 vCPU, 32 GB virtual storage; a user plane needs 2 VMs, and the virtual resource condition of each VM is 8 GB vRAM, 4 vCPU, and 64 GB virtual storage. The maximum number of calls which are processed per second is 10000, namely 10000 maxi-calls-per-sec.

The performance monitoring processing of the example includes the following steps.

The NM sends the message of creating performance threshold monitoring to the EM, requiring that the maximum number of calls per second (max-calls-per-sec) is set as the performance monitoring measurement, and the performance warning threshold is set as 9000, the scale up threshold is set as 9000. The NM sends the threshold policy to the EM in the same proportion.

The EM sends the message of creating performance threshold monitoring to the vPGW, and the vPGW sets the maximum number of calls per second (max-calls-per-sec) as the monitored performance measurement.

The vPGW reports the measured value of the max-calls-per-sec, and the measured value is 9500.

The EM determines to trigger the scale up operation according to the measured value 9500 and the scale up threshold 9000. The EM sends the request for the scale up operation to the VNFM.

The VNFM sends the message about the completion of the scale up operation to the EM, and the message carries the resource change situation after the vPGW is scaled up. For the control plane, the capacity of one of the 3 VMs is scaled up to 8 GB, 4 vCPU, and 64 GB and for the user plane, the capacity of one VM is scaled up to 12 GB, 6 vCPU, and 96 GB.

The EM calculates the new performance warning threshold and the scale up threshold.

It is first determined the maximum number of calls which are processed under the resource condition after scaling up. The specific method is that: first the current total virtual resources of the control plane of the vPGW are calculated as 16 GB vRAM, 8 vCPU, and 128 GB virtual storage, and compared with the total virtual resources, 12 GB vRAM, 6 vCUP and 96 GB virtual storage, of the control plane before scaling up, each one is increased by ⅓ capacity; then, the current total virtual resources of the user plane of the vPGW are calculated as 20 GB vRAM, 10 vCPU, and 160 GB virtual storage, and compared with the total virtual resources, 16 GB vRAM, 8 vCUP and 128 GB virtual storage, of the user plane before scaling up, each one is increased by ¼ capacity; if the user plane and the control plane adopt the value of the small scale up capacity, then the maximum number of calls which can be processed per second under the virtual resource after scaling up is 10000+10000*¼=12500.

The new performance warning threshold and scale up threshold are determined in combination with the threshold policy (in the same proportion). The specific method is: (9000/10000)*12500=11250.

The EM sends the threshold update notification to the NM, and the notification carries the performance warning threshold and the scale up threshold 12500.

The above flow omits the update of the scale down threshold. After scaling up is successful, the scale down threshold is updated, and the policy is also in the same proportion. For example, the scale down threshold before scaling up is 4000, after scaling up, the new scale down threshold is set as (4000/10000)*12500=5000.

EXAMPLE 11

In the example, the virtual resource condition of the vPGW is assumed as: the control plane VDU needs 3 VMs, and the virtual resource condition of each VM is 2 GB vRAM, 1 vCPU, 16 GB virtual storage; the user plane needs 2 VMs, and the virtual resource condition of each VM is 4 GB vRAM, 2 vCPU, and 32 GB virtual storage, the maximum number of calls which can be processed per second is 5000.

The performance monitoring processing of the example includes the following steps.

The NM sends the message of creating performance threshold monitoring to the EM, requiring that the maximum number of calls per second (max-calls-per-sec) is set as the performance monitoring measurement, and the performance warning threshold is set as 4500, the scale up threshold is set as 4000. The NM sends the threshold policy to the EM, and the performance warning threshold is 95% of the maximum capacity, and the scale up threshold is 90% of the maximum capacity.

The EM sends the message of creating performance threshold monitoring to the vPGW, and the vPGW sets the maximum number of calls per second (max-calls-per-sec) as the monitored performance measurement.

The vPGW reports the measured value of the max-calls-per-sec, and the measured value is 4200.

The EM determines that it is to trigger the scale up operation according to the measured value 4200 and the scale up threshold 4000. The EM sends the request for the scale up operation to the VNFM.

The VNFM sends the message about the completion of the scale up operation to the EM, and the message carries the maximum number of calls 10000 which can be processed per second after the vPGW is scaled up.

The EM calculates, according to the threshold policy, the new performance warning threshold as 10000*95%=9500, and calculates the new scale up threshold as 10000*90%=9000.

The EM sends the threshold update notification to the NM, and the notification carries the new performance warning threshold 9500 and the new scale up threshold 9000.

Similarly, in the above flow, it is also possible to update the scale down threshold, which will not be repeated here.

EXAMPLE 12

In the example, the VFN is vMME, and an uplink bandwidth of the S1-MME interface of the vMME is assumed as 10 G.

The performance monitoring processing of the example includes the following steps:

The NM sends the message of creating performance threshold monitoring to the EM, requiring that the number of uplink bytes per second of the S1-MME (IncDataOctS1MME) is set as the performance monitoring measurement, and the performance warning threshold is set as 9 G. The NM sends the performance warning threshold policy as 90% of the maximum processing capacity.

The EM sends to the NFVO the message of setting the monitored performance measurement of the vMME as IncDataOctS1MME, and the scale up threshold is 8.5 G, and the maximum processing capacity after scaling up is 15 G. The scale up threshold policy is in the same proportion. The NFVO sends the received information to the VNFM.

The vMME reports the measured value of the IncDataOctS1MME as 8.7 G.

The EM sends the measured value reported by the vMME to the VNFM.

The VNFM determines, according to the measured value 8.7 G and the scale up threshold 8.5 G, that it is to trigger the scale up operation.

After the scale up operation of the vMME is completed, the VNFM sends the notification message about the completion of the scale up operation to the EM, and the message carries the maximum processing capacity after scaling up. The VNFM calculates, according to the scale up threshold policy, the new scale up threshold as (8.5 G/10 G)*15 G=12.75 G.

The EM calculates, according to the performance warning threshold policy, the new warning threshold as 15 G*92%=13.8 G, and notifies the new warning threshold to the NM.

Similarly, in the above flow, it is also possible to update the scale down threshold, which will not be repeated here.

Those skilled in the art can understand that: all or parts of the steps in the method are completed by means of hardware instructed by a program. The program is stored in a computer readable storage media, such as a Read-Only Memory (ROM), a magnetic disk, or a compact disk. Optionally, all or part of the steps in the embodiments can also be implemented by using one or more integrated circuits; correspondingly, each component/unit in the embodiments can be realized in form of either hardware or software function component. The present disclosure is not limited to any particular combination of hardware and software.

The above are the exemplary embodiments of the present disclosure and not intended to limit the present disclosure. For those skilled in the art, the present disclosure may have various modifications and changes. Any modifications, equivalent replacements, improvements and the like within the scope as claimed in claims of the present disclosure shall fall within the scope of protection of the present disclosure.

INDUSTRIAL APPLICABILITY

At least some embodiments of present disclosure provide a method for implementing VNF performance monitoring and corresponding system. The method includes that: the EM receives the threshold policy of the VNF performance monitoring threshold sent by the NM or the OSS; the EM acquires the related information about virtual resources after the VNF is scaled up/down; and the EM sets the new performance monitoring threshold for the VNF according to the threshold policy and the related information about virtual resources after the VNF is scaled up/down, and the performance monitoring threshold includes at least one of a scale up/down threshold and a performance warning threshold. At least some embodiments of the present disclosure implement dynamic adjustment of a performance monitoring threshold according to a resource condition of a VNF, and with the threshold policy, allow improved logicality and controllability in setting the monitoring threshold, thereby implementing improved effectiveness in resource allocation and reducing performance warning threshold warnings.

What is claimed is:

1. A method for implementing Virtual Network Function (VNF) performance monitoring, comprising:
  receiving, by an Element Management (EM), a threshold policy of a VNF performance monitoring threshold sent by a Network Management (NM) or an Operation Support System (OSS);
  acquiring, by the EM, related information about virtual resources after the VNF is scaled up/down; and
  setting, by the EM, a new performance monitoring threshold for the VNF according to the threshold policy and the related information about virtual resources after the VNF is scaled up/down, wherein the performance monitoring threshold comprises at least one of a scale up/down threshold and a performance warning threshold.

2. The method as claimed in claim 1, wherein before setting, by the EM, the new performance monitoring threshold for the VNF, further comprising:
receiving, by the EM, an initial VNF performance monitoring threshold sent by the NM or the OSS; after setting, by the EM, the new performance monitoring threshold for the VNF, the method further comprises:
notifying, by the EM, a new VNF performance monitoring threshold to the NM or the OSS;
or acquiring, by the EM, the related information about virtual resources after the VNF is scaled up/down comprises: receiving, by the EM, the related information about virtual resources after the VNF is scaled up/down which is sent by a VNF Manager (VNFM); or, receiving, by the EM, the related information about virtual resources after the VNF is scaled up/down which is sent by the VNF.

3. The method as claimed in claim 2, wherein before receiving, by the EM, the related information about virtual resources after the VNF is scaled up/down which is sent by the VNF, further comprising:
receiving, by the EM, an information change notification which is sent by the VNF after the VNF is scaled up/down; and
requesting, by the EM, the VNF for the related information about virtual resources after the VNF is scaled up/down;
or the performance monitoring threshold comprises the scale up/down threshold, and before acquiring, by the EM, the related information about virtual resources after the VNF is scaled up/down, further comprising:
receiving, by the EM, a monitored performance measurement of the VNF sent by the NM or the OSS, and indicating, by the EM, the VNF to measure the monitored performance measurement and obtain a measured value; comparing, by the EM, the measured value with a current scale up/down threshold of the VNF, and when determining to scale up or scale down the VNF, sending, by the EM, a request message to the VNFM, so as to request the VNFM to perform a scale up operation or a scale down operation to the virtual resources of the VNF;
or the threshold policy received by the EM comprises a threshold policy of a performance warning threshold; and the new performance monitoring threshold that the EM sets for the VFN comprises a performance warning threshold; before receiving, by the EM, the related information about virtual resources after the VNF is scaled up/down which is sent by the VNFM, the method further comprises: obtaining, by the VNFM, a measured value of the monitored performance measurement of the VNF; comparing, by the VNFM, the measured value with a current scale up/down threshold of the VNF, and when determining to scale up or scale down the VNF, performing, by the VNFM, the scale up operation or the scale down operation to the virtual resources of the VNF.

4. The method as claimed in claim 3, wherein obtaining, by the VNFM, the measured value of the monitored performance measurement of the VNF comprises: receiving, by the VNFM, the monitored performance measurement of the VNF which is sent by the NM or the OSS through a Network Function Virtualization Orchestrator (NFVO), and indicating, by the VNFM, a Virtualized Infrastructure Manager (VIM) to measure the monitored performance measurement of the VNF and obtain the measured value; or,
receiving, by the VNFM, a measured value of the monitored performance measurement of the VNF sent by the EM;
or before performing, by the VNFM, the scale up operation or the scale down operation to the virtual resources of the VNF, further comprising: receiving, by the VNFM, a threshold policy of a scale up/down threshold of the VNF which is sent by the NM or the OSS through the NFVO; after performing, by the VNFM, the scale up operation or the scale down operation to the virtual resources of the VNF, the method further comprises: performing, by the VNFM, the scale up operation or the scale down operation successfully, and setting, by the VNFM, a new scale up/down threshold for the VNF according to the related information about virtual resources after the VNF is scaled up/down and the threshold policy of the scale up/down threshold.

5. The method as claimed in claim 4, wherein before determining, by the VNFM, to scale up or scale down the VNF, further comprising:
receiving, by the VNFM, an initial scale up/down threshold of the VNF which is sent by the NM or the OSS through the NFVO;
after setting, by the VNFM, the new scale up/down threshold for the VNF, the method further comprises:
notifying, by the VNFM, the new scale up/down threshold of the VNF to the NM or the OSS through the NFVO.

6. The method as claimed in claim 1, wherein the related information about virtual resources comprises at least one of information about virtual resource capacity and information about the maximum processing capacity corresponding to a monitored performance measurement.

7. The method as claimed in claim 6, wherein the threshold policy is set with a ratio value required between a performance monitoring threshold and a value of a virtual resource capacity or the maximum processing capacity corresponding to the monitored performance measurement.

8. The method as claimed in claim 3, wherein the scale up/down threshold comprises at least one of a scale up threshold and a scale down threshold; comparing, by the EM, the measured value with the current scale up/down threshold of the VNF to determine whether to scale up or scale down the VNF comprises:
for the monitored performance measurement which requires more resources when a value of the monitored performance measurement is greater, when the measured value is greater than the scale up threshold, determining, by the EM, to scale up the VNF; and/or, when the measured value is less than the scale down threshold, determining, by the EM, to scale down the VNF;
for the monitored performance measurement which requires more resources when the value of the monitored performance measurement is smaller, when the measured value is less than the scale up threshold, determining, by the EM, to scale up the VNF; and/or, when the measured value is greater than the scale down threshold, determining, by the EM, to scale down the VNF;
or the threshold policy received by the EM comprises a threshold policy of a performance warning threshold; and a new performance monitoring threshold that the EM sets for the VFN comprises a performance warning threshold; after performing, by the VNFM, the scale up operation to the virtual resources of the VNF, the method further comprises: failing, by the VNFM, to perform the scale up operation; receiving, by the EM, a notification about failing to scale up the VNF which is sent by the VNFM or the VNF, comparing, by the EM, the measured value with the current performance warning threshold of the VNF, and when determining, by the EM, to warn, sending, by the EM, a VNF performance warning notification to the NM or the OSS;

or after performing, by the VNFM, the scale up operation or the scale down operation to the virtual resources of the VNF, the method further comprises: when the VNFM fails to perform the scale up operation or the scale down operation, sending, by the VNFM, a notification about failing to scale up or scale down the VNF to the NM or the OSS through the NFVO; or when the VNFM fails to perform the scale up operation or the scale down operation, sending, by the VNFM, a notification about failing to scale up or scale down the VNF to the EM; after receiving the notification, sending, by the EM, the notification about failing to scale up or scale down the VNF to the NM or the OSS.

9. A method for implementing Virtual Network Function (VNF) performance monitoring, comprising:

receiving, by a VNF Manager (VNFM), a threshold policy of a VNF performance monitoring threshold which is sent by a Network Management (NM) or an Operation Support System (OSS) through a Network Function Virtualization Orchestrator (NFVO);

acquiring, by the VNFM, related information about virtual resources after the VNF is scaled up/down; and setting, by the VNFM, a new performance monitoring threshold for the VNF according to the threshold policy and the related information about virtual resources after the VNF is scaled up/down, wherein the performance monitoring threshold comprises at least one of a scale up/down threshold and a performance warning threshold.

10. The method as claimed in claim 9, wherein before setting, by the VNFM, the new performance monitoring threshold for the VNF, further comprising:

receiving, by the VNFM, an initial VNF performance monitoring threshold sent by the NM or the OSS through the NFVO;

after setting, by the VNFM, the new performance monitoring threshold for the VNF, the method further comprises:

notifying, by the VNFM, the new VNF performance monitoring threshold to the NM or the OSS through the NFVO;

or before acquiring, by the VNFM, the related information about virtual resources after the VNF is scaled up/down, further comprising: obtaining, by the VNFM, a measured value of a monitored performance measurement of the VNF; comparing, by the VNFM, the measured value with a current scale up/down threshold of the VNF, and when determining to scale up or scale down the VNF, performing, by the VNFM, a scale up operation or a scale down operation to the virtual resources of the VNF, so as to acquire the related information about virtual resources after the VNF is scaled up/down.

11. The method as claimed in claim 10, wherein the scale up/down threshold comprises at least one of a scale up threshold and a scale down threshold; comparing, by the VNFM, the measured value with the current scale up/down threshold of the VNF to determine whether to scale up or scale down the VNF comprises:

for the monitored performance measurement which requires more resources when a value of the monitored performance measurement is greater, when the measured value is greater than the scale up threshold, determining, by the VNFM, to scale up the VNF; and/or, when the measured value is less than the scale down threshold, determining, by the VNFM, to scale down the VNF;

for the monitored performance measurement which requires more resources when the value of the monitored performance measurement is smaller, when the measured value is less than the scale up threshold, determining, by the VNFM, to scale up the VNF; and/or, when the measured value is greater than the scale down threshold, determining, by the VNFM, to scale down the VNF;

or obtaining, by the VNFM, the measured value of the monitored performance measurement of the VNF comprises: receiving, by the VNFM, the monitored performance measurement of the VNF which is sent by the NM or the OSS through a Network Function Virtualization Orchestrator (NFVO), indicating, by the VNFM, a Virtualized Infrastructure Manager (VIM) to measure the monitored performance measurement of the VNF and obtain the measured value; or, receiving, by the VNFM, the measured value of the monitored performance measurement of the VNF sent by the EM;

or the performance monitoring threshold comprises a performance warning threshold and a scale up/down threshold; after performing, by the VNFM, the scale up operation to the virtual resources of the VNF, the method further comprises: failing, by the VNFM, to perform the scale up operation; comparing, by the VNFM, the measured value with a current performance warning threshold of the VNF, and when determining, by the VNFM, to warn, sending, by the VNFM, the performance warning threshold of the VNF to the NM or the OSS;

or after performing, by the VNFM, the scale up operation or the scale down operation to the VNF, further comprising: when the VNFM fails to perform the scale up operation or the scale down operation, sending, by the VNFM, the notification about failing to scale up or scale down the VNF to the NM or the OSS through the NFVO.

12. The method as claimed in claim 9, wherein the related information about virtual resources comprises at least one of information about virtual resource capacity and information about the maximum processing capacity corresponding to the monitored performance measurement.

13. An Element Management (EM) system, comprising:

a first interface component to perform information interaction with a Network Management (NM) or an Operation Support System (OSS), comprising: receiving a threshold policy of a Virtual Network Function (VNF) performance monitoring threshold sent by the NM or the OSS;

a second interface component to perform information interaction with the VNF;

a third interface component to perform information interaction with a VNF Manager (VNFM);

a threshold setting component to set a new performance monitoring threshold for the VNF according to the threshold policy and related information about virtual resources after the VNF is scaled up/down which is acquired from the second interface component or the third interface component, wherein the performance monitoring threshold comprises at least one of a scale up/down threshold and a performance warning threshold.

14. The EM system as claimed in claim 13, wherein the first interface component is further arranged to perform information interaction with the NM or the OSS further comprises the following steps: receiving an initial VNF performance monitoring threshold sent by the NM or the OSS; and notifying a new VNF performance monitoring threshold to the NM or the OSS;
or the first interface component is further arranged to receive a monitored performance measurement of the VNF sent by the NM or the OSS; the second interface component is further arranged to perform information interaction with the VNF comprises the following step: indicating the VNF to measure the monitored performance measurement and obtain a measured value; the EM system further comprises: a scale determining component to compare the measured value with a current scale up/down threshold of the VNF, and when determining to scale up or scale down the VNF, send a request message to the VNFM, so as to request the VNFM to perform a scale up operation or a scale down operation to the virtual resources of the VNF;
or the related information about virtual resources after the VNF is scaled up/down, which is acquired by the threshold setting component, comprises at least one of information about virtual resource capacity and the maximum processing capacity corresponding to the monitored performance measurement after the VNF is scaled up/down.

15. The EM system as claimed in claim 14, wherein,
the threshold setting component is further arranged to set the new performance monitoring threshold for the VNF according to the threshold policy and the related information about virtual resources after the VNF is scaled up/down comprises the following steps: calculating the new performance monitoring threshold according to at least one of a value of the virtual resource capacity and the maximum processing capacity corresponding to the monitored performance measurement after the VNF is scaled up/down and a ratio value set in the threshold policy;
or the scale up/down threshold comprises at least one of a scale up threshold and a scale down threshold; the scale determining component is arranged to compare the measured value with the current scale up/down threshold of the VNF to determine whether to scale up or scale down the VNF comprises the following steps: for the monitored performance measurement which requires more resources when a value of the monitored performance measurement is greater, when the measured value is greater than the scale up threshold, determining to scale up the VNF; and/or, when the measured value is less than the scale down threshold, determining to scale down the VNF; for the monitored performance measurement which requires more resources when the value of the monitored performance measurement is smaller, when the measured value is less than the scale up threshold, determining to scale up the VNF; and/or, when the measured value is greater than the scale down threshold, determining to scale down the VNF;

or further comprising: a warning determining component to receive from the second interface component or the third interface component a notification about failing to scale up the VNF which is sent by the VNFM or the VNF, and compare the measured value with the current performance warning threshold of the VNF to determine whether to warn; the first interface component is further arranged to, when the warning determining component determines to warn, send a VNF performance warning notification to the NM or the OSS;
or the third interface component is further arranged to receive a notification about failing to scale up or scale down the VNF which is sent by the VNFM; the first interface component is further arranged to send the notification about failing to scale up or scale down the VNF to the NM or the OSS.

16. A Virtual Network Function Manager (VNFM) system, comprising:
a first interface component to perform information interaction with a Network Management (NM) or an Operation Support System (OSS) through a Network Function Virtualization Orchestrator (NFVO), comprising: receiving a threshold policy of a Virtual Network Function (VNF) performance monitoring threshold which is sent by the NM or the OSS through the NFVO;
a second interface component to perform information interaction with an Element Management (EM);
a third interface component to perform information interaction with a Virtualized Infrastructure Manager (VIM);
a threshold setting component to set a new performance monitoring threshold for the VNF according to the threshold policy and related information about virtual resources after the VNF is scaled up/down, wherein the performance monitoring threshold comprises at least one of a scale up/down threshold and a performance warning threshold.

17. The VNFM system as claimed in claim 16, wherein,
the first interface component is arranged to perform information interaction with the NM or the OSS through the NFVO further comprises the following steps: receiving an initial VNF performance monitoring threshold sent by the NM or the OSS through the NFVO, and notifying the new VNF performance monitoring threshold to the NM or the OSS through the NFVO;
or further comprising: a scale determining component to compare an obtained measured value with a current scale up/down threshold of the VNF, and when determining to scale up or scale down the VNF, notify a scale performing component to perform a scale up operation or a scale down operation to the virtual resources of the VNF; and a scale performing component to perform the scale up operation or the scale down operation to the virtual resources of the VNF, and acquire the related information about virtual resources after the VNF is scaled up/down.

18. The VNFM system as claimed in claim 17, wherein the scale up/down threshold comprises at least one of a scale up threshold and a scale down threshold;
the scale determining component is arranged to compare the measured value with the current scale up/down threshold of the VNF to determine whether to scale up or scale down the VNF comprises the following steps:
for the monitored performance measurement which requires more resources when a value of the monitored performance measurement is greater, when the measured value is greater than the scale up threshold, determining to scale up the VNF; and/or, when the measured value is less than the scale down threshold, determining to scale down the VNF;

for the monitored performance measurement which requires more resources when the value of the monitored performance measurement is smaller, when the measured value is less than the scale up threshold, determining to scale up the VNF; and/or, when the measured value is greater than the scale down threshold, determining to scale down the VNF;

or the second interface component is further arranged to receive the measured value of the monitored performance measurement of the VNF which is sent by the EM; or the first interface component is further arranged to receive the monitored performance measurement of the VNF which is sent by the NM or the OSS through the NFVO; the third interface component is further arranged to send to the VIM an instruction of measuring the monitored performance measurement of the VNF and obtaining the measured value;

or the second interface component is further arranged to, after the scale performing component performs the scale up operation or the scale down operation to the virtual resources of the VNF, send to the EM the related information about virtual resources after the VNF is scaled up/down;

or the performance monitoring threshold comprises a performance warning threshold and a scale up/down threshold; the VNFM system further comprises: a warning determining component to, when the scale performing component fails to perform the scale up operation, compare the measure value with the current performance warning threshold of the VNF to determine whether to warn; the first interface component is further arranged to, when the warning determining component determines to warn, send a VNF performance warning notification to the NM or the OSS;

or the first interface component is further arranged to, when the scale performing component fails to perform the scale up operation or the scale down operation, send the notification about failing to scale up or scale down the VNF to the NM or the OSS through the NFVO.

19. The VNFM system as claimed in claim 18, wherein, the related information about virtual resources after the VNF is scaled up/down which is acquired by the threshold setting component comprises at least one of information about virtual resource capacity and the maximum processing capacity corresponding to the monitored performance measurement after the VNF is scaled up/down, or the threshold setting component, is arranged to set the new performance monitoring threshold for the VNF according to the threshold policy and the related information about virtual resources after the VNF is scaled up/down comprises the following steps: calculating the new performance monitoring threshold according to at least one of a value of the virtual resource capacity and the maximum processing capacity corresponding to the monitored performance measurement after the VNF is scaled up/down and a ratio value set in the threshold policy.

20. A computer readable storage medium, wherein at least one computer executable instruction is stored; the at least one computer executable instruction is used for performing a method as claimed in claim 1.

* * * * *